(12) United States Patent
Kurashima et al.

(10) Patent No.: US 8,957,826 B2
(45) Date of Patent: *Feb. 17, 2015

(54) ANTENNA DEVICE

(71) Applicant: Fujitsu Component Limited, Tokyo (JP)

(72) Inventors: Shigemi Kurashima, Tokyo (JP); Masahiro Yanagi, Tokyo (JP); Hideaki Yoda, Tokyo (JP)

(73) Assignee: Fujitsu Component Limited, Tokyo (JP)

( * ) Notice: Subject to any disclaimer, the term of this patent is extended or adjusted under 35 U.S.C. 154(b) by 238 days.

This patent is subject to a terminal disclaimer.

(21) Appl. No.: 13/645,752

(22) Filed: Oct. 5, 2012

(65) Prior Publication Data

US 2013/0093642 A1   Apr. 18, 2013

(30) Foreign Application Priority Data

Oct. 18, 2011   (JP) ................................. 2011-229216

(51) Int. Cl.

| | | |
|---|---|---|
| *H01Q 1/48* | (2006.01) | |
| *H01Q 1/38* | (2006.01) | |
| *H01Q 1/42* | (2006.01) | |
| *G06K 19/00* | (2006.01) | |
| *H01Q 9/04* | (2006.01) | |
| *H01Q 1/22* | (2006.01) | |

(52) U.S. Cl.

CPC . *H01Q 1/38* (2013.01); *H01Q 1/42* (2013.01); *H01Q 1/48* (2013.01); *G06K 19/00* (2013.01); *H01Q 9/0421* (2013.01); *H01Q 1/22* (2013.01)
USPC .......................................... 343/848; 343/702

(58) Field of Classification Search

CPC ............. H01Q 1/38; H01Q 1/42; H01Q 1/48; H01Q 1/22
USPC ........................... 343/702, 700 MS, 846, 848
See application file for complete search history.

(56) References Cited

U.S. PATENT DOCUMENTS

| | | | |
|---|---|---|---|
| 7,511,668 B2 * | 3/2009 | Hirabayashi | ........... 343/700 MS |
| 8,786,501 B2 * | 7/2014 | Yanagi et al. | ................. 343/702 |
| 2011/0009078 A1 | 1/2011 | Kawamura | |

FOREIGN PATENT DOCUMENTS

| | | |
|---|---|---|
| JP | 2001-266098 | 9/2001 |
| JP | 2006-018624 | 1/2006 |
| JP | 2007-299338 | 11/2007 |
| JP | 2008-083868 | 4/2008 |
| JP | 2011-022640 | 2/2011 |
| WO | WO 2007/125948 | 11/2007 |
| WO | WO 2008/038756 | 4/2008 |

* cited by examiner

*Primary Examiner* — Hoanganh Le
(74) *Attorney, Agent, or Firm* — IPUSA PLLC

(57) ABSTRACT

An antenna device to be inserted in a memory card slot of an electronic device, includes an insulating layer, an antenna element formed on one surface of the insulating layer, and a ground element formed on the other surface of the insulating layer, the antenna element and the ground element being formed such that at least a part of the antenna element and at least a part of the ground element protrude from the memory card slot of the electronic device when the antenna device is inserted in the memory card slot, respectively; and a ground pattern extending in parallel relationship with the antenna element to be electrically connected to at least the ground element.

11 Claims, 26 Drawing Sheets

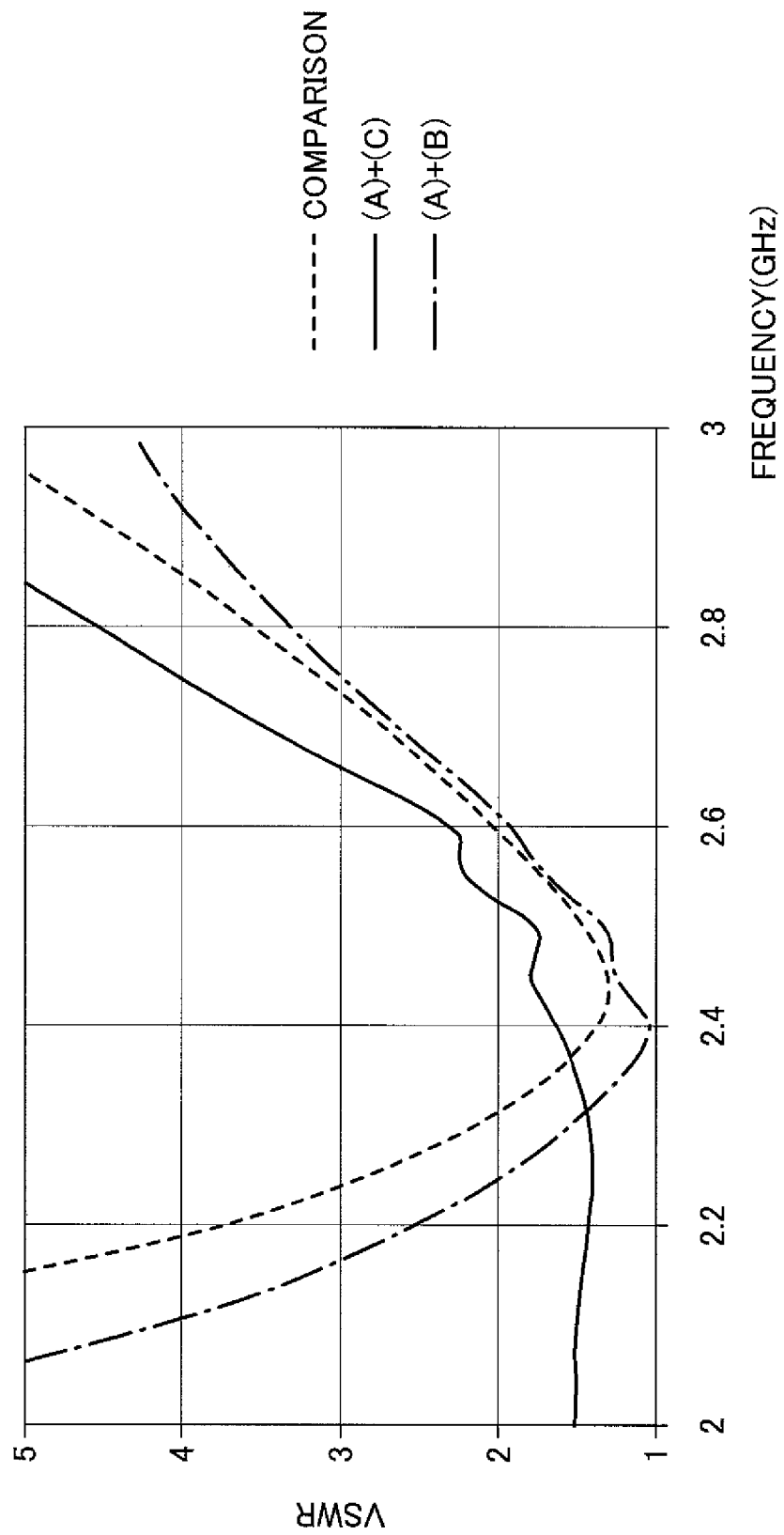

ANTENNA DEVICE

BACKGROUND OF THE INVENTION

1. Field of the Invention

The present invention relates to an antenna device.

2. Description of the Related Art

Generally, a digital camera or the like is used when obtaining an image, a video or the like. Then, the image or the like obtained by the digital camera or the like is stored in an internal storage medium of the camera or the like. However, as this kind of storage medium is built in the digital camera, the memory size of the storage medium is not large. Consequently, images, videos or the like having more than or equal to a predetermined period cannot be stored.

Thus, a method in which the obtained images or the like are stored in an external storage medium outside the digital camera and has a larger memory size by wirelessly sending the obtained images or the like to the external storage medium has been developed. With this method, the large volume of the obtained images or the like can be stored regardless of the memory size of the internal storage medium of the camera.

In order to wirelessly send information from the digital camera or the like to an external storage medium having a larger memory size, it is necessary to mount an antenna for radio communication in the digital camera. A memory card or the like on which an antenna for radio communication is mounted has been disclosed, for example.

When attaching a memory card to a digital camera or the like, generally, the memory card is inserted inside the digital camera or the like. However, the body of the digital camera includes a conductor portion. Thus, when the memory card on which an antenna is mounted is attached to the body of the camera, it is difficult to wirelessly transmit information to the external storage medium or the like.

PATENT DOCUMENT

[Patent Document 1] Japanese Laid-open Patent Publication No. 2001-266098
[Patent Document 2] Japanese Laid-open Patent Publication No. 2006-18624
[Patent Document 3] Japanese Laid-open Patent Publication No. 2007-299338
[Patent Document 4] Japanese Laid-open Patent Publication No. 2008-83868
[Patent Document 5] Japanese Laid-open Patent Publication No. 2011-22640
[Patent Document 6] International Patent Publication No. 2007/125948 A1
[Patent Document 7] International Patent Publication 2008/038756 A1

SUMMARY OF THE INVENTION

According to an embodiment, there is provided an antenna device to be inserted in a memory card slot of an electronic device, includes an insulating layer, an antenna element formed on one surface of the insulating layer, and a ground element formed on the other surface of the insulating layer, the antenna element and the ground element being formed such that at least a part of the antenna element and at least a part of the ground element protrude from the memory card slot of the electronic device when the antenna device is inserted in the memory card slot, respectively; and a ground pattern extending in parallel relationship with the antenna element to be electrically connected to at least the ground element.

BRIEF DESCRIPTION OF THE DRAWINGS

Other objects, features and advantages of the present invention will become more apparent from the following detailed description when read in conjunction with the accompanying drawings.

FIG. 21 is a view showing a result of a simulation of VSWR characteristics when the resistor is provided to the circuit substrate;

DETAILED DESCRIPTION OF THE PREFERRED EMBODIMENTS

Figure 1:
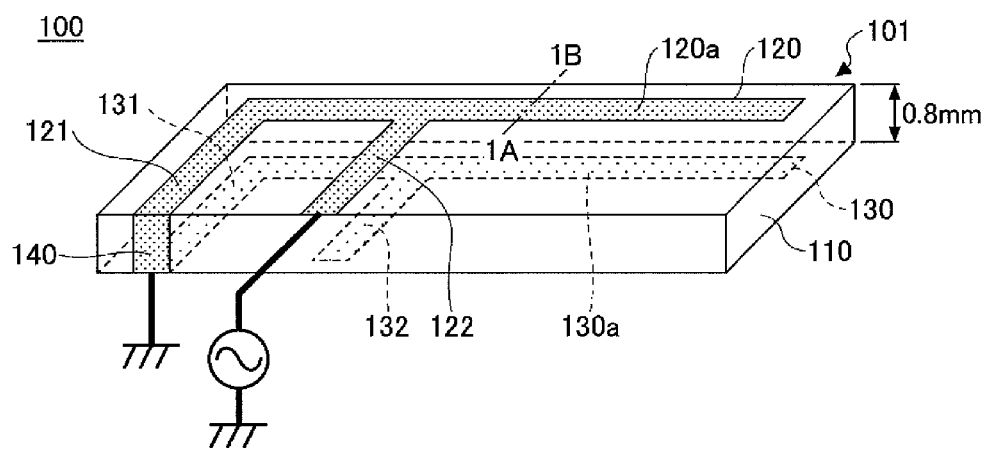
FIG. 1 is a schematic view showing an example of a structure of an antenna device of a first embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

In the following embodiments, an antenna device is manufactured into a form of a memory card. Thus, in the following embodiments, a memory card is explained as an example of an antenna device.

First Embodiment

Antenna Structure

First, an antenna structure to be included in the memory card of the embodiment is explained.

FIG. 1 is a schematic view showing an example of an antenna structure 100 of a first embodiment. In this embodiment, the antenna structure 100 includes a printed substrate 101 including an insulating layer 110, an antenna element 120 which is formed on one surface of the insulating layer 110, a ground element 130 which is formed on another surface of the insulating layer 110, and a connecting pattern 140.

In this embodiment, the insulating layer 110 is made of an epoxy resin having a thickness of about 0.8 mm. For example, an FR4 substrate may be used as the printed substrate 101 with a relative dielectric constant ∈r of about 4.7.

In the first embodiment, the antenna element 120, the ground element 130, and the connecting pattern 140 are made of a metal material such as copper or the like.

The antenna element 120 and the ground element 130 are substantially symmetrically formed from each other while interposing the insulating layer 110 therebetween at substantially the same position in a plane view.

The antenna element 120 includes a linear portion 120a (an example of a first linear portion), a power supply portion 122, and an end portion 121 (an example of a first ground portion). The linear portion 120a has a longer length than those of the power supply portion 122 and the end portion 121.

The ground element 130 includes a linear portion 130a (an example of a second linear portion), a stub portion 132, and an end portion 131 (an example of a second ground portion). The linear portion 130a has a longer length than those of the stub portion 132 and the end portion 131.

In this embodiment, the antenna element 120 and the ground element 130 are formed to have a reversed "F" shape, respectively. Specifically, the linear portion 120a extends in a first direction. The end portion 121 is provided at an end of the linear portion 120a to extend in a second direction substantially perpendicular to the first direction. The power supply portion 122 is provided to extend in the second direction to be in parallel relationship with the end portion 121 in the vicinity of the end portion 121.

The linear portion 130a extends in the first direction to overlap the linear portion 120a in a plane view. The stub portion 132 and the end portion 131 extend in the second direction to substantially overlap the power supply portion 122 and the end portion 121, respectively.

Here, the end portion 121 and the end portion 131 extend to an end of the insulating layer 110 in the second direction and are connected with each other via the connecting pattern 140 which is formed at a side wall of the insulating layer 110.

As will be explained later, the end portion 131 of the ground element 130 is grounded via a ground pattern. Thus, the end portion 121 and the connecting pattern 140 are also grounded.

The stub portion 132, which functions as a stub, does not extend to the end of the insulating layer 110 in the second direction and is open. Thus, the ground element 130 is grounded at the end portion 131.

The antenna element 120 is applied with a predetermined high frequency voltage, 2.4 GHz to 2.5 GHz for example, at the power supply portion 122.

The antenna structure 100 of the first embodiment is used in a communication at a frequency band between 2.4 GHz to 2.5 GHz such as Wireless Local Area Networks (wireless LAN), Bluetooth (BT, registered trademark) or the like. Further, although not shown in the drawings, inductors each having a predetermined inductance may be connected to the antenna element 120 and the ground element 130, respectively, for adjusting a resonance frequency in the antenna structure 100 of the first embodiment.

Specifically, the antenna element 120 and the ground element 130 may be formed by patterning a metal material such as copper or the like formed on the insulating layer 110 in accordance with a similar method as forming interconnect patterns. The insulating layer 110 may be a substrate made of another dielectric material such as a ceramics substrate formed by AlN, Al$_2$O$_3$ or the like, a plastic plate or the like.

(Circuit Substrate)

Figure 2:
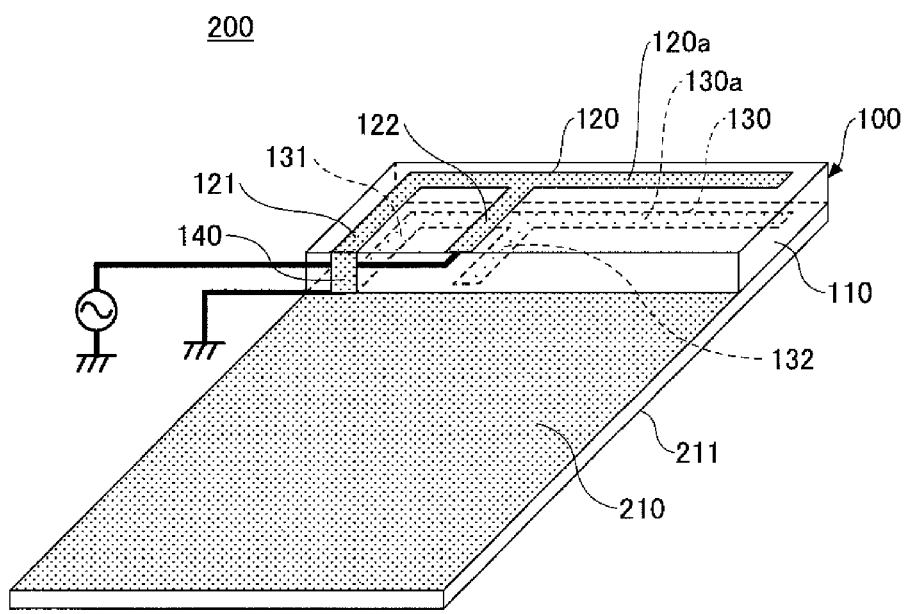
FIG. 2 is a schematic view showing an example of a structure of a circuit substrate of the first embodiment.

FIG. 2 is a schematic view showing an example of a structure of a circuit substrate 200 including the antenna structure 100 of the embodiment. In this embodiment, the circuit substrate 200 includes a printed substrate 211 and the antenna structure 100 mounted on the printed substrate 211.

The printed substrate 211 includes a ground pattern 210, which is grounded, formed on one surface on which the antenna structure 100 is also mounted. It means that the ground pattern 210 is formed to be extend in a plane which is parallel to the surfaces of the insulating layer 110. The ground pattern 210 is connected to the end portion 131 of the ground element 130 so that the connecting pattern 140 and the end portion 121 of the antenna element 120 are also electrically connected to the ground pattern 210. Further in this embodiment, the ground pattern 210 is formed not to overlap the antenna element 120 and the ground element 130.

Figure 3:
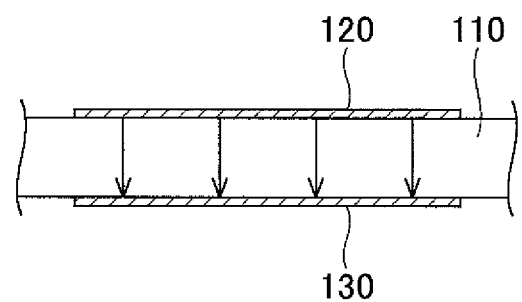
FIG. 3 is a side view showing an example of the antenna device of the first embodiment.

FIG. 3 is a partial side view taken along a dashed 1A-1B line shown in FIG. 1. FIG. 3 shows a structure in which the antenna element 120 and the ground element 130 are symmetrically formed at both surfaces of the insulating layer 110 while interposing the insulating layer 110 there between.

With this structure, an electric field as shown by arrows is generated between the antenna element 120 and the ground element 130 when a high frequency voltage is applied to the antenna element 120. In other words, the electric field is generated in a width direction of the insulating layer 110.

(Memory Card)

In this embodiment, the antenna structure 100 formed on the circuit substrate 200 is incorporated into a memory card. The memory card (an example of the antenna device) of the embodiment is explained.

Figure 4:
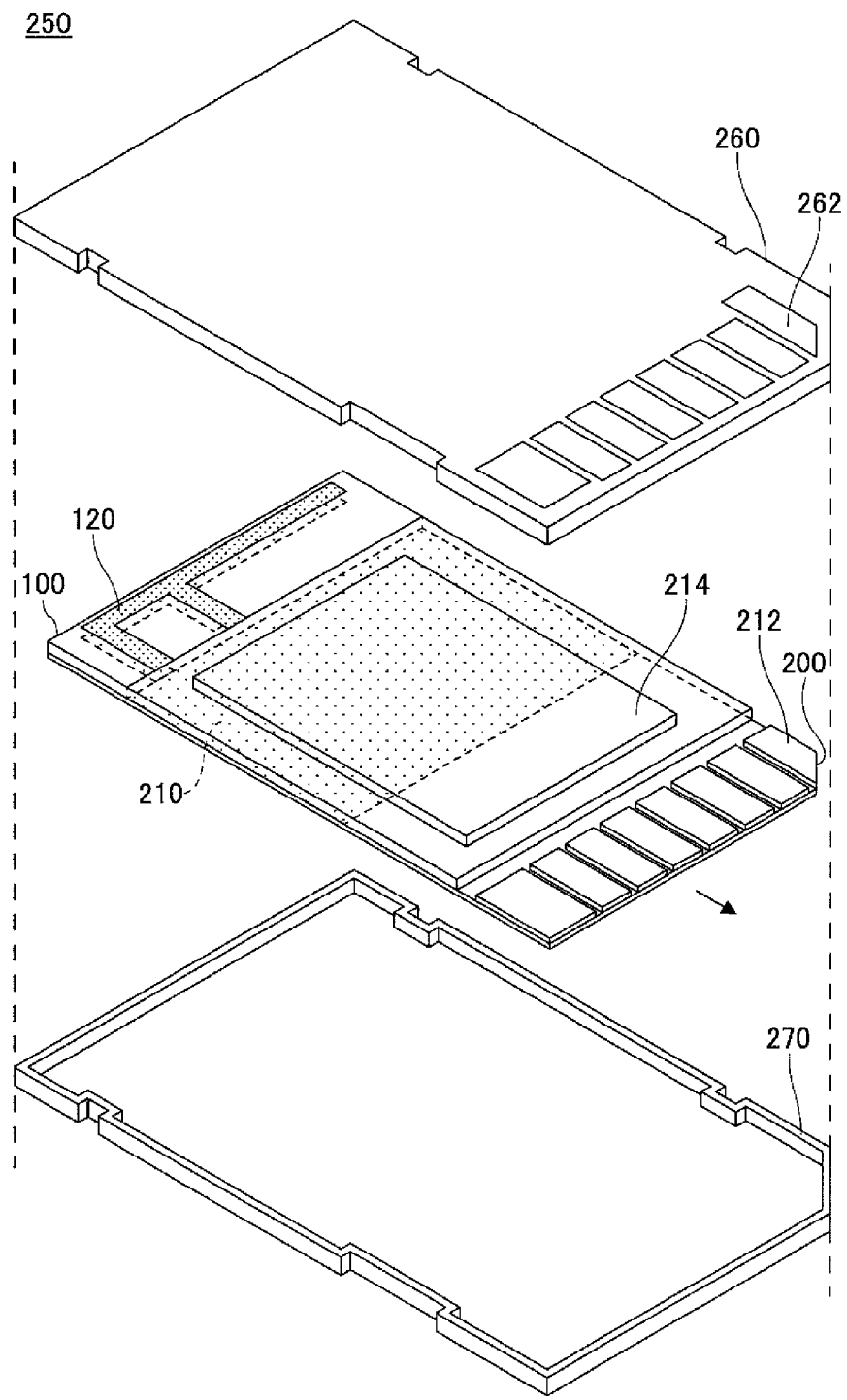
FIG. 4 is a schematic view showing an example of a structure of a memory card of the first embodiment.

FIG. 4 is a schematic view showing an example of a structure of a memory card 250 of the embodiment. Here, the memory card 250 is a Secure Digital (SD) card in this embodiment. However, other standards or kinds of memory cards may be similarly used.

As shown in FIG. 4, the memory card 250 includes the circuit substrate 200, a first housing 260, and a second housing 270 (the first housing 260 and the second housing 270 are an example of a housing).

The first housing 260 and the second housing 270 are made of a resin material such as a plastic or the like. The circuit substrate 200 is included in a space surrounded by the first housing 260 and the second housing 270.

As will be explained later, a digital camera which is an example of an electronic device in this embodiment, includes a memory card slot formed inside the digital camera to which the memory card 250 is to be inserted.

The circuit substrate 200 is provided with external connection terminals 212 to be connected to terminals of the digital camera provided in the memory card slot. Further, the circuit substrate 200 includes an electronic component 214 including a memory, an electronic circuit or the like mounted thereon for actualizing functions as a typical memory card and functions for performing a radio communication.

The first housing 260 is provided with opening portions 262 for exposing the external connection terminals 212. The memory card 250 is formed by bonding the first housing 260 and the second housing 270 to cover the circuit substrate 200.

In this embodiment, the memory card 250 is configured to be inserted into the memory card slot in a direction shown by an arrow. The external connection terminals 212 are provided at an end portion of the memory card 250 in the inserting direction of the memory card 250. It means that the external connection terminals 212 which are to be connected to the terminals of the digital camera are inserted inside the digital camera. The antenna structure 100 is provided at another end portion of the memory card 250 opposite to the end portion at which the external connection terminals 212 are provided. Thus, the antenna structure 100 is positioned in the vicinity of an insertion port of the memory card slot.

(Attachment of Memory Card)

Figure 5:
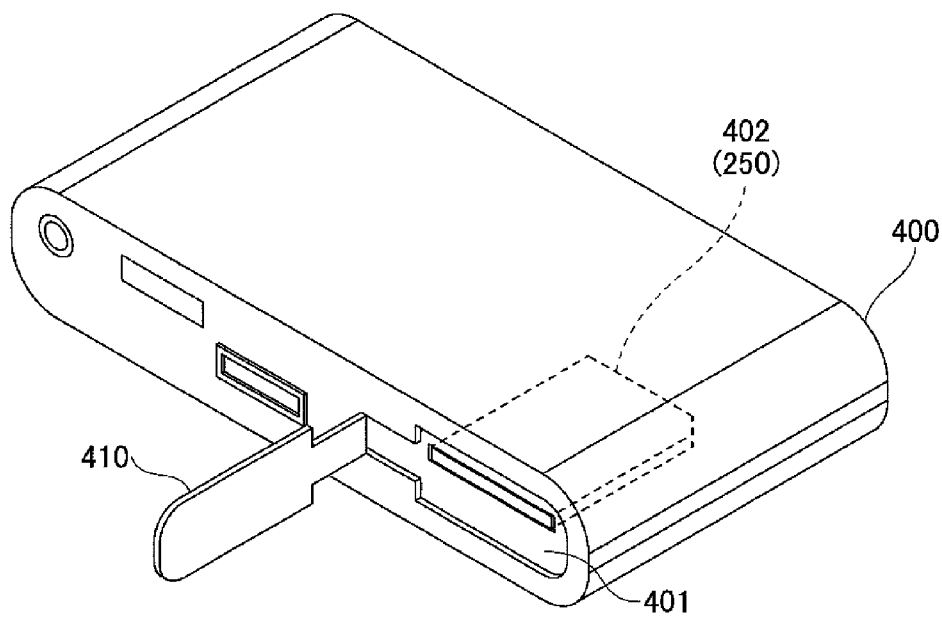
FIG. 5 is a perspective view showing an example of a digital camera to which the memory card is to be attached.
Figure 6:
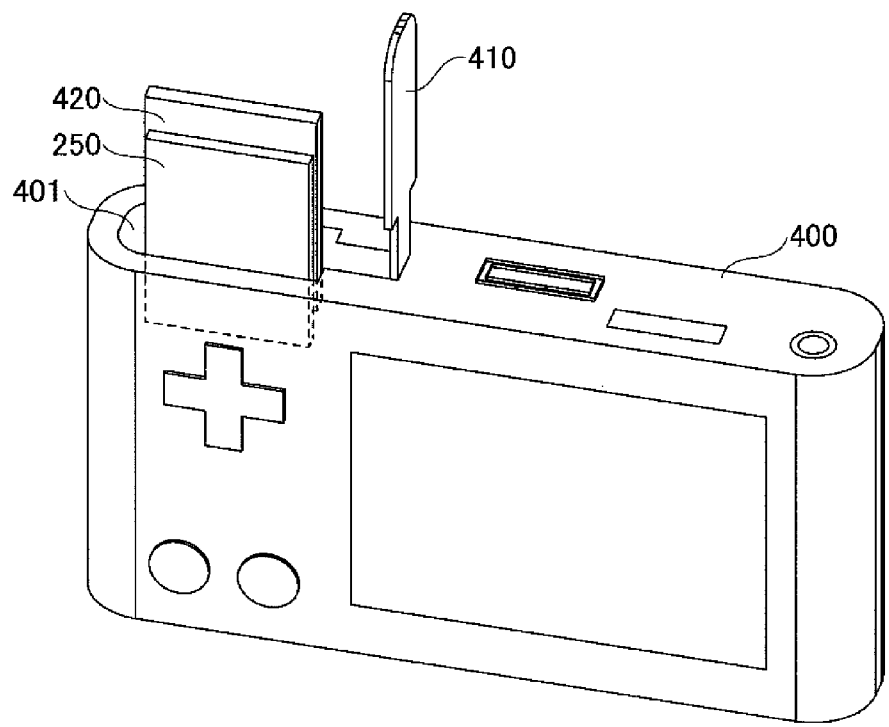
FIG. 6 is a perspective view for explaining a positional relationship between the memory card and the battery in the digital camera.

FIG. 5 and FIG. 6 are perspective views showing an example of a digital camera 400 to which the memory card 250 is to be attached.

As shown in FIG. 5 and FIG. 6, the digital camera 400 includes an inner housing portion 401 by which a memory card slot 402 is formed and a cover 410. The memory card 250 is to be inserted into the memory card slot 402 to be electrically connected to the digital camera 400. After the memory card 250 is inserted in the memory card slot 402 inside the digital camera 400, the memory card slot 402 is covered by the cover 410.

As shown in FIG. 6, generally, in the digital camera 400, it is designed that the battery 420 is to be placed in the vicinity of a place where the memory card 250 is to be inserted (the memory card slot 402) because of a reason of layout.

Figure 7:
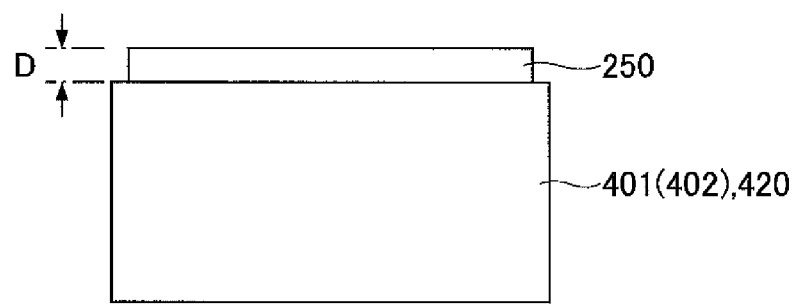
FIG. 7 is a plan view showing a positional relationship between an inner housing portion or a battery of the digital camera and the memory card when the memory card is attached.

FIG. 7 is a plan view showing a positional relationship between the inner housing portion 401 (the memory card slot 402) of the digital camera 400 or the battery 420 in the digital camera 400 and the memory card 250 when the memory card 250 is attached to the digital camera 400.

Here, the digital camera 400 is configured such that when the memory card 250 is inserted into the memory card slot 402, the memory card 250 is attached to the digital camera 400 by pushing the memory card 250 toward the digital camera 400 side, and removed from the digital camera 400 by pushing the memory card 250 attached in the digital camera 400 again. Thus, as shown in FIG. 7, the memory card 250 is configured to be protruded from peripheral portions of the inner housing portion 401 or the battery 420 so that the memory card 250 is capable of being attached to or removed from the digital camera 400 by pushing the memory card 250 toward the digital camera 400 side.

In this embodiment, the memory card 250 is configured to protrude from the inner housing portion 401 or the battery 420 for a distance "D". The distance "D" is about 1 mm, for example.

Here, the inner housing portion 401 of the digital camera 400 may be formed to be thick, and thus may shut a radio wave or the like sent to and sent from the antenna element 120. Further, as the battery 420 is made of electrical conductive materials, the battery 420 tends to exert influence on the radio wave or the like sent to and sent from the antenna element 120.

Thus, in this embodiment, the antenna element 120 is formed at a portion of the memory card 250 which protrudes from the inner housing portion 401 or the battery 420 when the memory card 250 is inserted in the memory card slot 402. Especially, the linear portion 120a of the antenna element 120 is formed to protrude from the inner housing portion 401 (the memory card slot 402) or the battery 420 when the when the memory card 250 is inserted in the memory card slot 402.

(Width and Position of Antenna Element)

Figure 8:
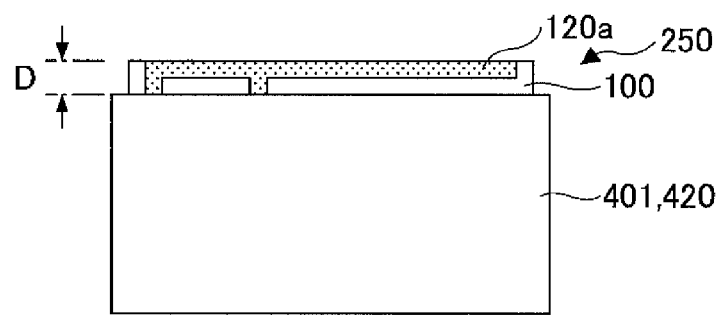
FIG. 8 is a view for explaining an example of an linear portion of the antenna element of the first embodiment.
Figure 9:
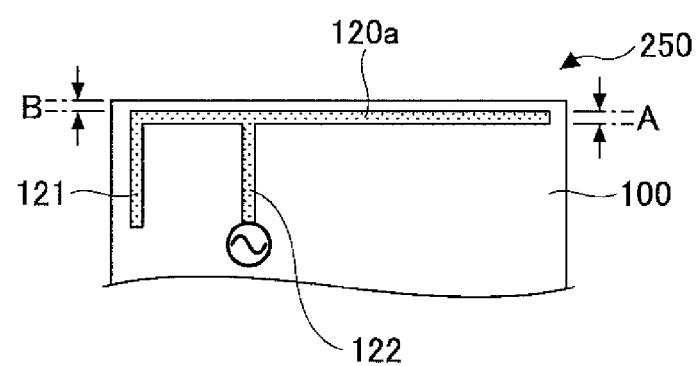
FIG. 9 is a view for explaining an example of a position of the linear portion of the antenna element of the first embodiment.

FIG. 8 and FIG. 9 are views for explaining an example of the antenna element 120 of the first embodiment. With reference to FIG. 8 and FIG. 9, the width and the position of the antenna element 120 are explained in detail.

As described above, the memory card 250 is configured to protrude from the inner housing portion 401, the battery 420 or the like for the distance "D". Here, at least a part of the antenna element 120, specifically the linear portion 120a, is formed at a portion of the memory card 250 which protrudes from the inner housing portion 401 or the battery 420.

In this embodiment, as shown in FIG. 8, the entirety of the linear portion 120a of the antenna element 120 of the antenna structure 100 is formed outside the inner housing portion 401, the battery 420 or the like.

The width "A" of the linear portion 120a (see FIG. 9) may be determined so that the entirety of the linear portion 120a of the antenna element 120 is formed outside the inner housing portion 401, the battery 420 or the like.

For the case shown in FIG. 8, the linear portion 120a of the antenna element 120 is formed at an edge of the antenna structure 100. Thus, the width "A" of the linear portion 120a may be determined to be about less than the distance "D". Therefore, when the distance "D" is about 1 mm, the width "A" of the linear portion 120a may be determined to be about less than 1 mm.

However, when the linear portion 120a of the antenna element 120 is not formed at the edge of the antenna structure 100 but formed at a distance "B" from the edge as shown in FIG. 9, the distance "B" from the edge of the antenna structure 100 to the linear portion 120a and the width "A" of the linear portion 120a may be set such that a sum of the width "A" and the distance "B" becomes less than the distance "D".

Further, the width "A" of the linear portion 120a may be greater than or equal to 0.05 mm. By structuring the width "A" of the linear portion 120a to be greater than or equal to 0.05 mm, the resistance value of the linear portion 120a can be appropriately controlled so that the antenna element 120 can have good characteristics as an antenna.

The distance "B" may be less than or equal to 0.5 mm.

The linear portion 120a is made of a metal material such as copper or the like having a thickness of 0.035 mm to 0.04 mm.

Figure 10:
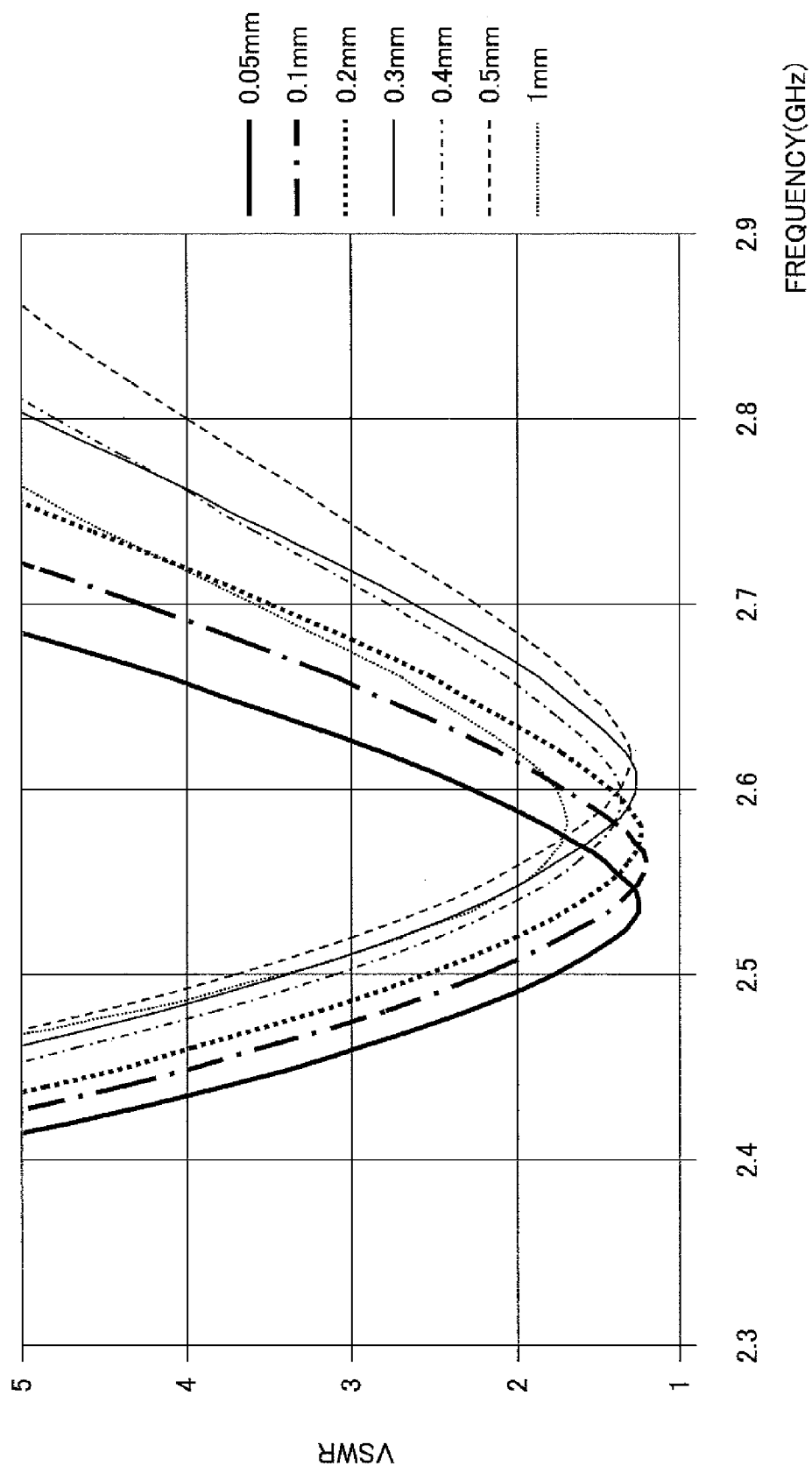
FIG. 10 is a view showing VSWR characteristics when width of the linear portion of the antenna element is varied.

FIG. 10 is a view showing a result of a simulation of Voltage Standing Wave Ratio characteristics (hereinafter, simply referred to as "VSWR characteristics") while varying the width "A" of the linear portion 120a of the antenna element 120 of the antenna structure 100.

Figure 11:
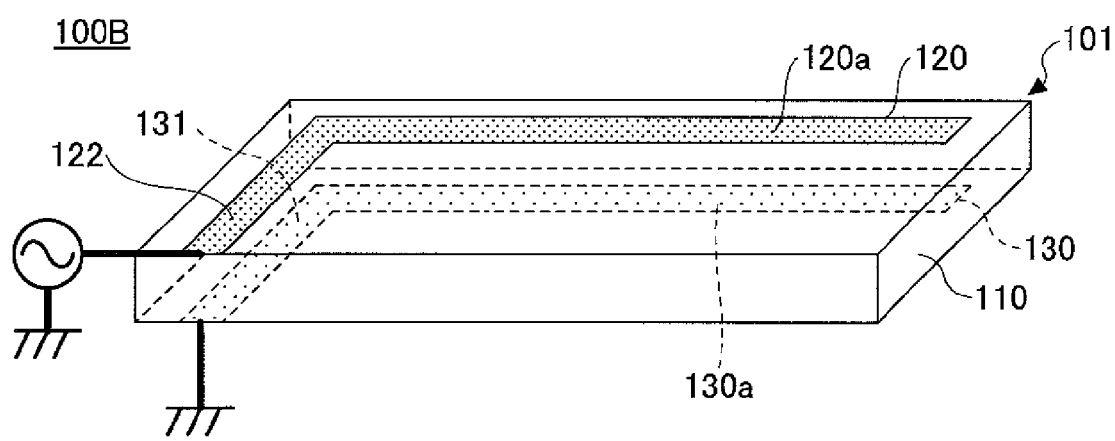
FIG. 11 is a schematic view showing another example of a structure of an antenna device of the first embodiment

Here, the result shown in FIG. 10 is obtained by using another example of the antenna structure 100 in which the antenna element 120 and the ground element 130 respectively have an "L" shape as shown in FIG. 11. In FIG. 11, the antenna element 120 includes the linear portion 120a extending in the first direction and the power supply portion 122 connected to the first linear portion 120a and extending in the second direction substantially perpendicular to the first direction. The ground element 130 includes the linear portion 130a and the end portion 131 (an example of a ground portion) connected to the linear portion 130a and extending in the second direction to overlap the power supply portion 122 of the antenna element 120 in a plan view.

However, it is considered that the same tendency can be obtained when the antenna structure 100 in which the antenna element 120 and the ground element 130 respectively have a reversed "F" shape as shown in FIG. 1 to FIG. 9 is used. Further, the lower value of VSWR means a reflection is smaller.

As shown in FIG. 10, when the width "A" of the linear portion 120a is formed to be less than 1 mm, the VSWR characteristics do not change.

Further, when the width "A" of the linear portion 120a is formed to be less than or equal to 0.5 mm, the VSWR characteristics are further improved. This is because by forming the width "A" of the linear portion 120a to be less than or equal to 0.5 mm, the entirety of the linear portion 120a is formed at a portion of the memory card 250 which protrudes from the inner housing portion 401 or the battery 420.

Figure 12:
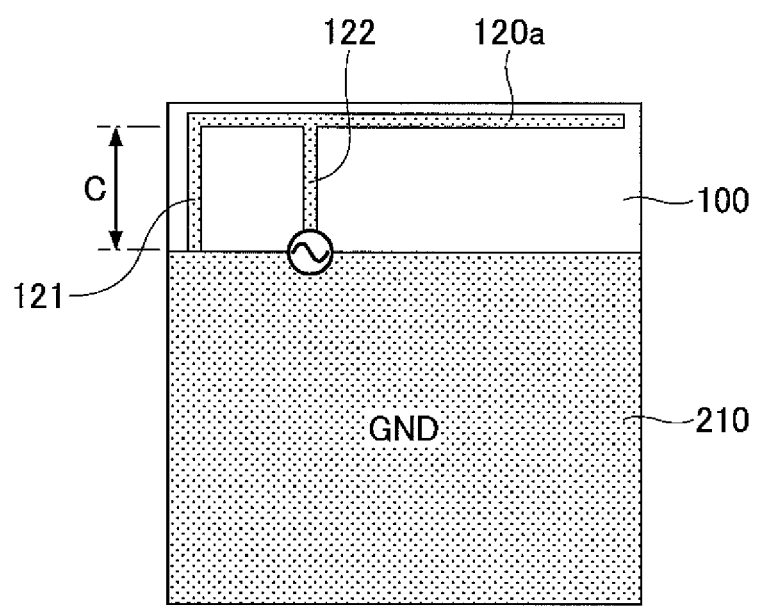
FIG. 12 is a view for explaining an example of a position of the linear portion of the antenna element of the first embodiment.

FIG. 12 is a view for explaining an example of a position of the linear portion 120a. As shown in FIG. 12, in the antenna structure 100 of the embodiment, a distance "C" between the linear portion 120a and the ground pattern 210 is configured to be less than or equal to 0.05λ mm. Here, "λ" is a wavelength of a predetermined high frequency voltage (a radio wave) applied to the antenna element 120. In the antenna structure 100 of the first embodiment, as a radio wave whose frequency is 2.4 GHz to 2.5 GHz is used, the distance "C" is determined to be less than or equal to about 5 mm.

When the distance "C" between the linear portion 120a and the ground pattern 210 is too small, characteristics of the antenna structure 100 may be lowered. Further, even when the ground pattern 210 is inserted inside the inner housing portion 401, the battery 420 or the like, the characteristics of the antenna structure 100 is not reduced. Thus, when considering the characteristics, manufacturing or the like of the antenna structure 100, the linear portion 120a may be formed to protrude from the inner housing portion 401, the battery 420 or the like, and the ground pattern 210 may be formed to be covered by the inner housing portion 401, the battery 420 or the like when the memory card 250 is inserted in the memory card slot 402 of the digital camera 400.

(Characteristics of Antenna Device)

Figure 13:
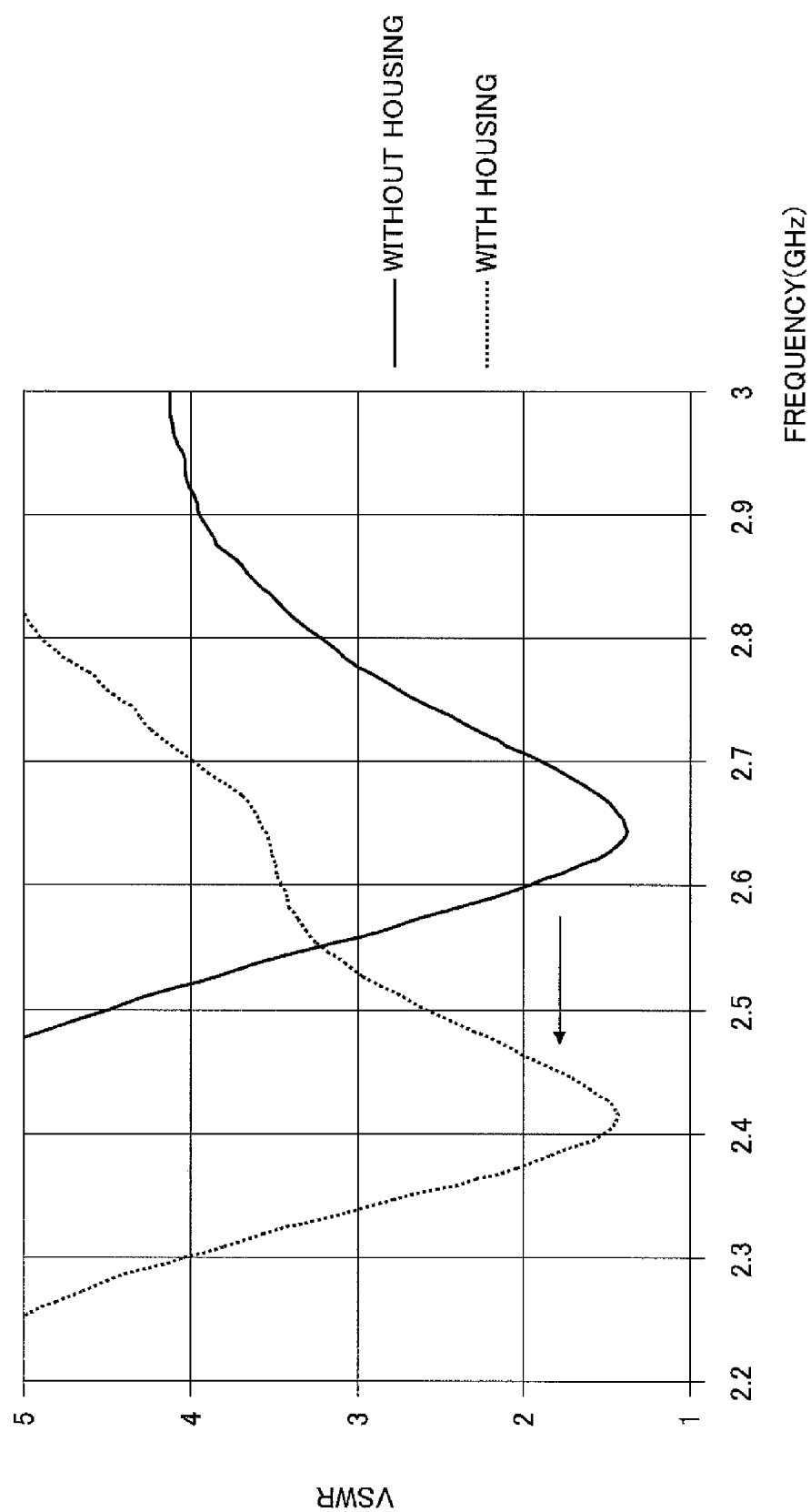
FIG. 13 is a view showing VSWR characteristics of the antenna device and the memory card of the first embodiment.

Next, VSWR characteristics of the circuit substrate 200, before being manufactured into a form of a memory card and the memory card 250 of the embodiment are explained for evaluating an influence of the housings). FIG. 13 is a view showing VSWR characteristics of the circuit substrate 200 and the memory card 250 of the embodiment.

It is desirable that a frequency at which the VSWR value becomes the lowest (hereinafter, simply referred to as a "frequency at the minimum VSWR value") does not shift even when the memory card is attached to a digital camera or by kinds of digital cameras.

As shown in FIG. 13, for a case where only the circuit substrate 200 is used (without housings), and a case where the memory card 250 in which the circuit substrate 200 is covered by the first housing 260 and the second housing 270 (with housings) is used, the VSWR characteristics vary. The frequency at the minimum VSWR value shifts to a lower frequency side when the circuit substrate 200 is covered by the first housing 260 and the second housing 270 (with housings). It is considered that the materials composing the first housing 260 and the second housing 270 influence on the VSWR characteristics.

Thus, when manufacturing the memory card 250, the antenna structure 100 may be prepared by taking a shift amount of the frequency to a lower frequency side into account.

Similar to the result shown in FIG. 10, the result shown in FIG. 13 is obtained by using the other example of the antenna structure 100 in which the antenna element 120 and the ground element 130 respectively have an "L" shape as shown in FIG. 11. However, it is considered that the same tendency can be obtained when the antenna structure 100 in which the antenna element 120 and the ground element 130 respectively have a reversed "F" shape as shown in FIG. 1 to FIG. 9 is used.

Next, VSWR characteristics of the memory card 250 without being attached to a digital camera and the memory card 250 attached to digital cameras are explained.

Figure 14:
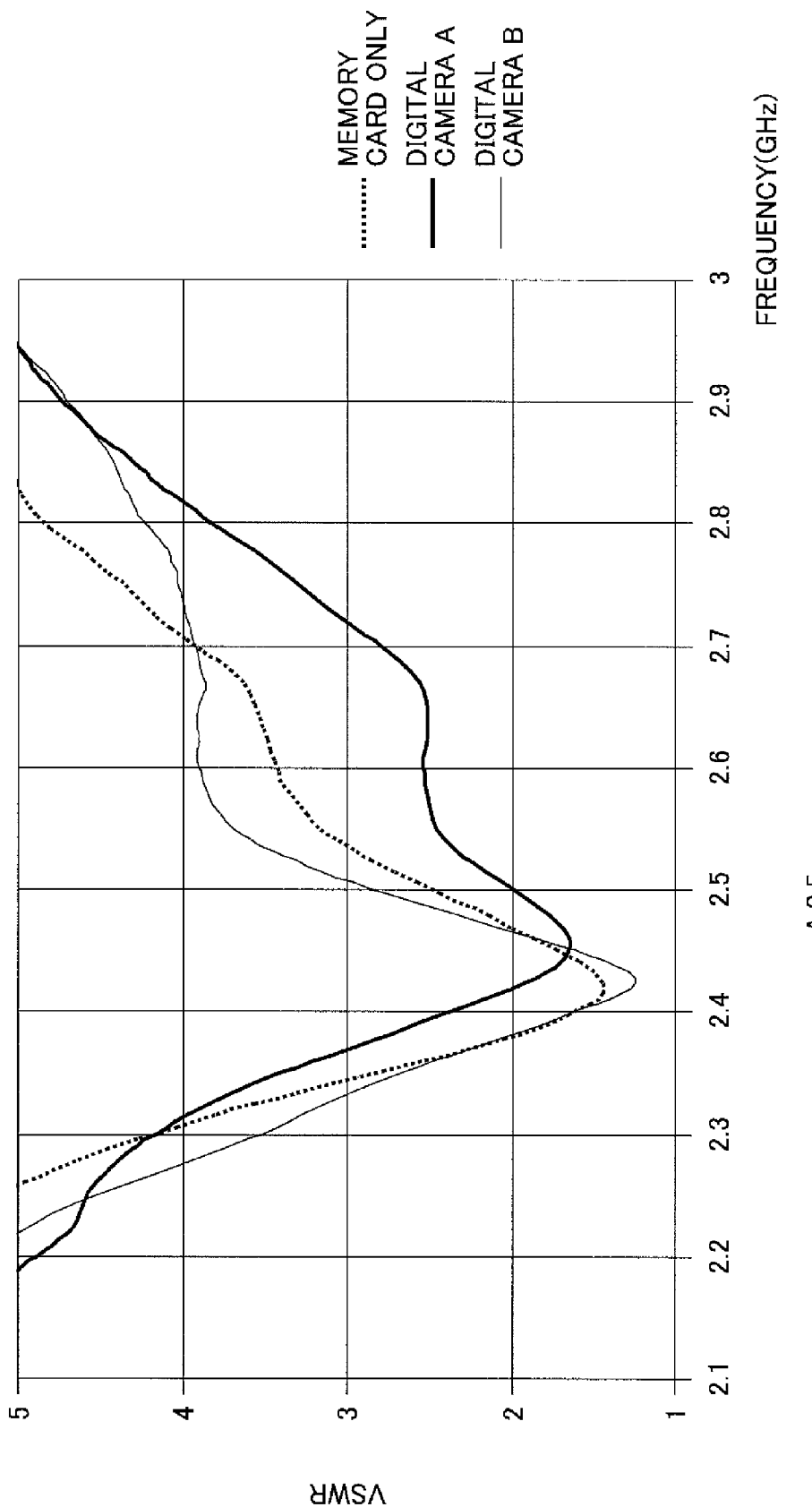
FIG. 14 is a view showing VSWR characteristics of the memory card of the first embodiment.

FIG. 14 is a view showing VSWR characteristics of the memory card 250 of the first embodiment where the width "A" of the linear portion 120a is 0.5 mm including a case without being inserted into a digital camera (shown as "memory card only"), and cases where the memory card 250 is inserted into two kinds of digital cameras A and B.

Figure 15:
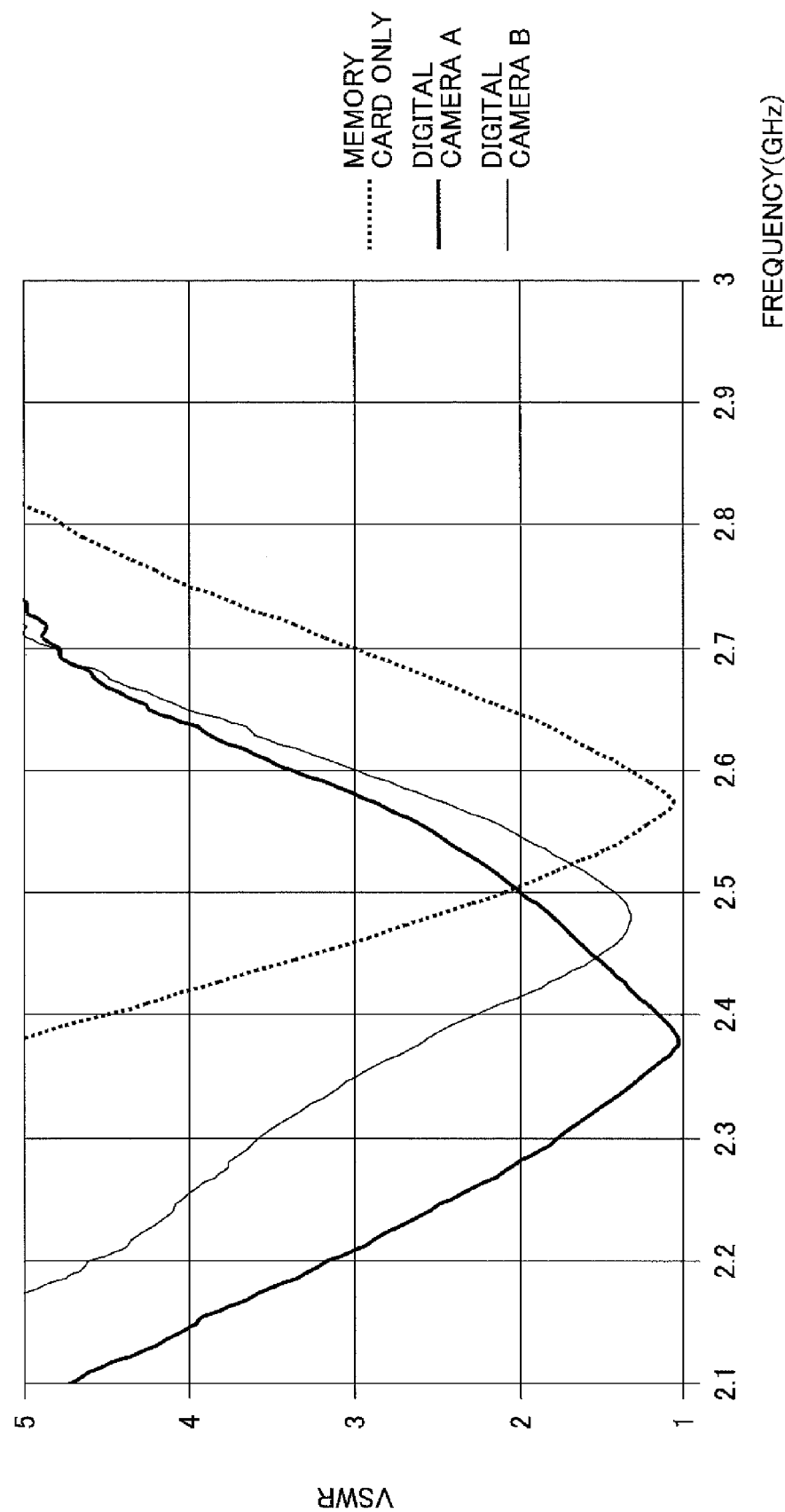
FIG. 15 is a view showing VSWR characteristics of a conventional memory card with an antenna.

FIG. 15 is a view showing VSWR characteristics of a conventional memory card with an antenna including a case without being inserted into a digital camera (shown as "memory card only"), and cases where the memory card is inserted into the two kinds of digital camera A and digital camera B. For this conventional memory card, an antenna element is positioned inside a memory card slot when the memory card is inserted in the memory card slot.

As shown in FIG. 15, when the memory card is attached to a digital camera or the like, a frequency at the minimum VSWR value may shift. However, as shown in FIG. 14, by designing the width "A" of the linear portion 120a such that the linear portion 120a tend to protrude from the memory card slots of various kinds of digital cameras, the frequency at the minimum VSWR value does not shift even when the memory card is inserted into the digital camera, or inserted into different kinds of digital cameras.

(Method of Manufacturing Antenna Device and Circuit Substrate)

A method of manufacturing the antenna structure 100 and the circuit substrate 200 of the first embodiment is explained.

Figure 16:
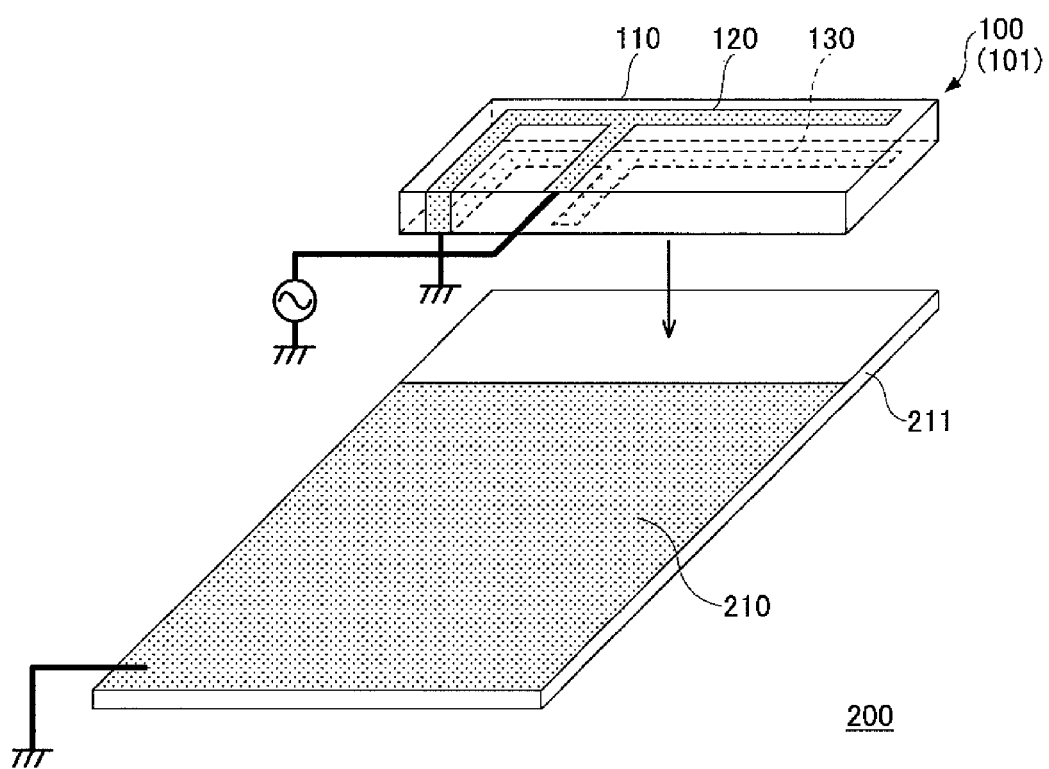
FIG. 16 is a view for explaining an example of a method of manufacturing a circuit substrate of the first embodiment.

FIG. 16 is a view for explaining an example of a method of manufacturing the circuit substrate 200 of the first embodiment.

The circuit substrate 200 of the embodiment is formed as follows as shown in FIG. 16. First, the antenna structure 100 including the insulating layer 110 on both surfaces of which the antenna element 120 and the ground element 130 are respectively formed, and on the side wall of which the connecting pattern 140 is formed, is previously prepared. Further, the printed substrate 211 including the ground pattern 210 formed on the surface of which is also previously prepared. Then, the antenna structure 100 is bonded to a predetermined position of the printed substrate 211 so that the ground element 130 and the ground pattern 210 are electrically connected.

Figure 17:
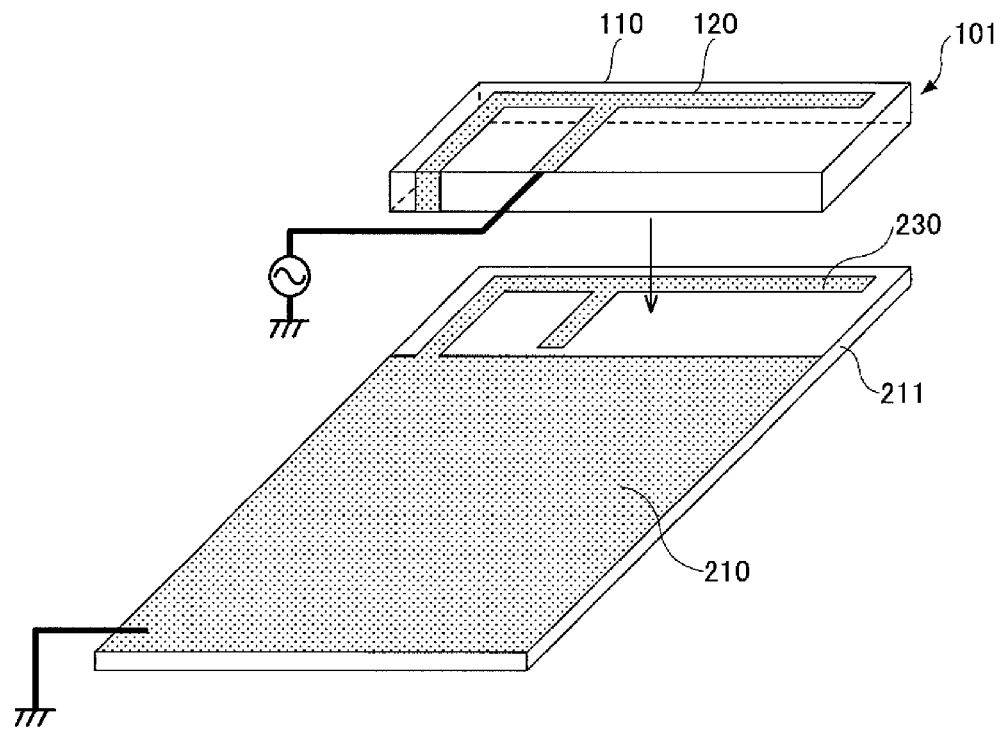
FIG. 17 is a view for explaining another example of a method of manufacturing the circuit substrate of the first embodiment.

Alternatively, the circuit substrate 200 of the embodiment is formed as shown in FIG. 17. FIG. 17 is a view for explaining another example of a method of manufacturing the circuit substrate 200 of the first embodiment.

In this case, a ground element portion 230 having a shape similar to the ground element 130 and electrically connected to the ground pattern 210 is formed on a surface of the printed substrate 211 with the ground pattern 210. Further, in this case, the antenna element 120 and the connecting pattern 140 are formed on the insulating layer 110. Then, the printed substrate 101 including the insulating layer 110 the antenna element 120 and the connecting pattern 140 is bonded to a portion of the printed substrate 211 where the ground element portion 230 is formed such that the ground element portion 230 and the antenna element 120 overlap in a plane view.

Figure 18:
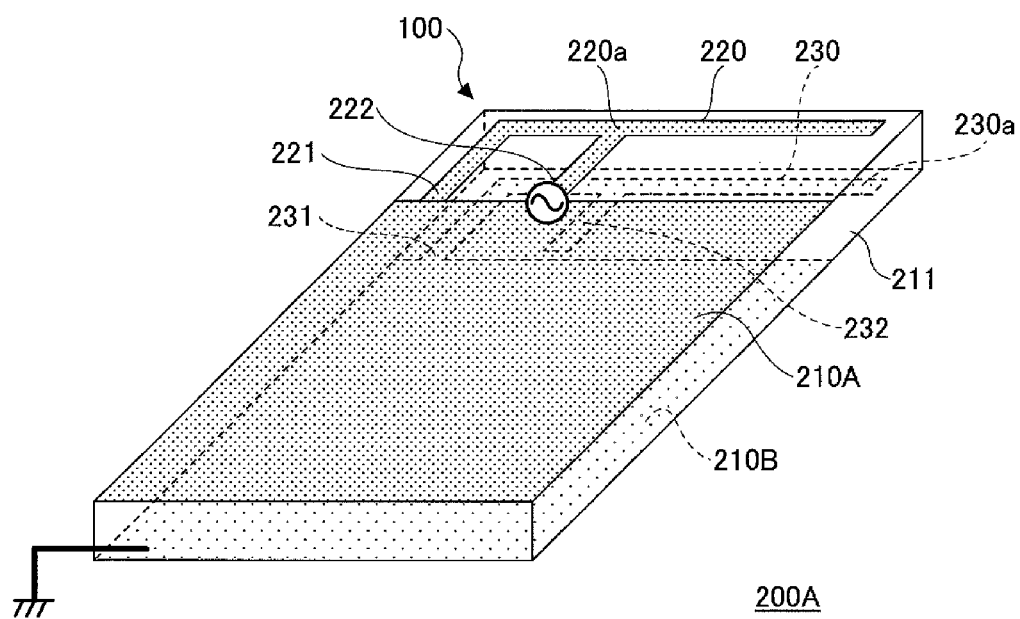
FIG. 18 is a schematic view showing another example of a structure of a circuit substrate of the first embodiment.

FIG. 18 is a schematic view showing another example of a structure of a circuit substrate 200A of the first embodiment. As shown in FIG. 18, the circuit substrate 200A of the first embodiment may have a structure where an antenna element portion 220 and a ground pattern 210A are formed on one surface of the printed substrate 211, and the ground element portion 230 and a ground pattern 210B are formed on the other surface of the printed substrate 211. In this case, the antenna structure 100 is composed by the printed substrate 211, the antenna element portion 220, and the ground element portion 230. Circuits including elements such as a memory or the like may be formed in the ground pattern 210A or the ground pattern 210B.

The antenna element portion 220 includes an end portion 221 which is connected to the ground pattern 210A and a power supply portion 222 to which a power is supplied.

The ground element portion 230 includes an end portion 231 which is connected to the ground pattern 210B and a stub portion 232 which is open.

Here, the antenna element portion 220 functionally corresponds to the antenna element 120, and the ground element portion 230 functionally corresponds to the ground element 130.

With this structure, the antenna structure 100 and the grand patterns 210A and 210B can be formed on a single printed substrate to reduce cost for manufacturing the memory card 250 of the embodiment.

Figure 19:
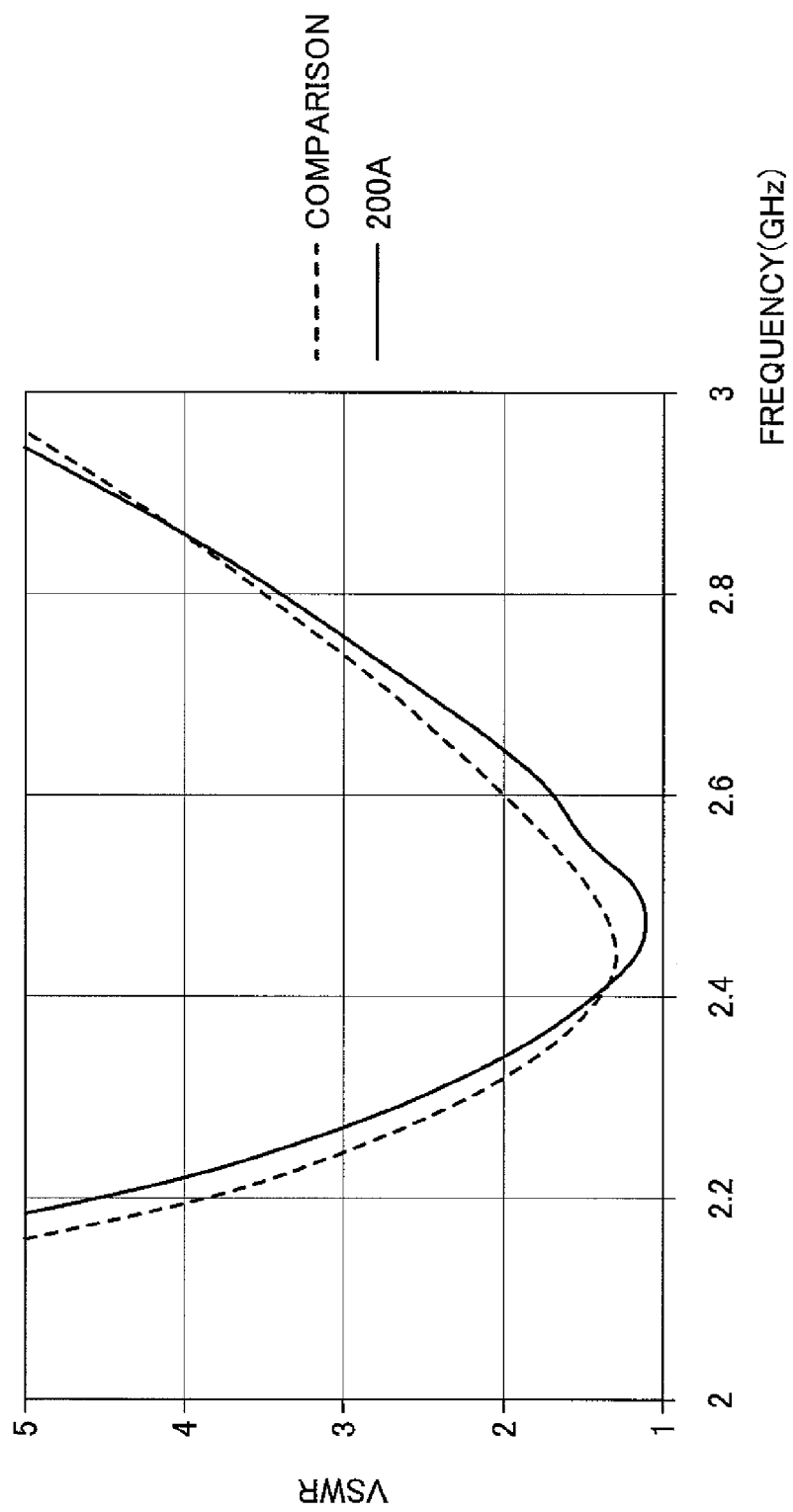
FIG. 19 is a view showing a result of a simulation of VSWR characteristics of the circuit substrate shown in FIG. 18.

FIG. 19 is a view showing a result of a simulation of VSWR characteristics of the circuit substrate 200A shown in FIG. 18. With reference to FIG. 19, the VSWR characteristics and gain of the circuit substrate 200A shown in FIG. 18 are explained.

FIG. 19 shows the VSWR characteristics of the circuit substrate 200A shown in FIG. 18 and an antenna for comparison. The antenna for comparison in this example has a structure similar to that of the circuit substrate 200A but does not include the ground element portion 230 and the ground pattern 210B. It means that the antenna device for comparison includes the printed substrate 211, the antenna element portion 220, and the ground pattern 210A.

In this simulation, the sizes are as follows. The width of the printed substrate 211 is (a length in an X-axis direction) 30 mm, the length of the printed substrate 211 (a length in a Y-axis direction) is 35 mm, and a thickness of the printed substrate 211 (a length in a Z-axis direction of the printed substrate 211 where the antenna element portion 220, the ground pattern 210A, the ground element portion 230 and the ground pattern 210B are not formed) is 5 mm. The widths of the antenna element portion 220 and the ground element portion 230 are 1 mm, respectively. The lengths of the linear portion 220a of the antenna element portion 220 and the length of the linear portion 230a of the ground element portion 230 (the length in the X-axis direction) are 24 mm, respectively.

As shown in FIG. 19, for the circuit substrate 200A, the minimum value of VSWR characteristics near 2.45 GHz is lowered compared with that of the antenna device for comparison and the VSWR characteristics are improved. Here, both the maximum value of gains of the circuit substrate 200A and the antenna device for comparison are +2.3 dBi, respectively.

As described above, according to the circuit substrate 200A, the VSWR characteristics are improved by forming the ground element portion 230 and the ground pattern 210B.

Further, a resistor may be provided in the antenna structure 100. The result of the simulation of the VSWR characteristics of the circuit substrates 200A when a resistor is provided in the antenna structure 100 is explained in the following.

Figure 20A:
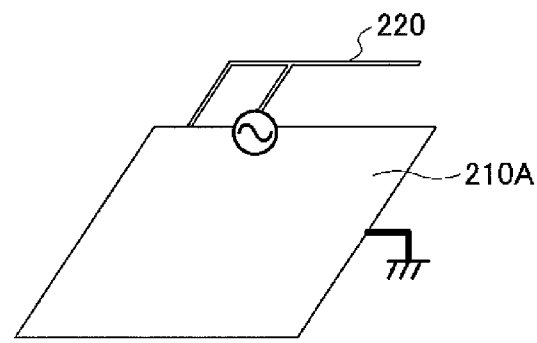
FIG. 20A to FIG. 20D are schematic views for explaining a case where a resistor is provided in the antenna device of the embodiment.
Figure 20B:
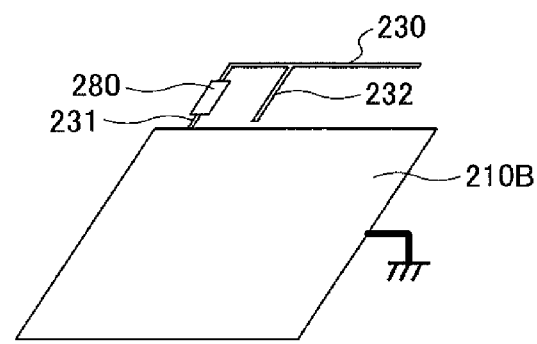
Figure 20C:
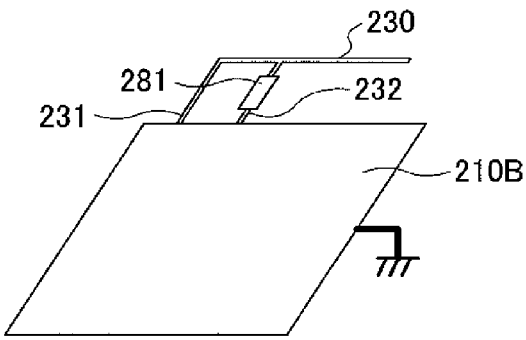

FIG. 20A is a schematic view showing the antenna element portion 220, and the ground pattern 210A which are the same as those shown in FIG. 18. FIG. 20B and FIG. 20C are schematic views showing the ground element portion 230 and the ground pattern 210B where a resistor 280 and a resistor 281 are provided, respectively. The structures shown in FIG. 20B and FIG. 20C are combined with the structure shown in FIG. 20A, respectively to form the circuit substrates 200A as shown in FIG. 20D, although the printed substrate 211 is not shown in FIG. 20A to FIG. 20C.

In FIG. 20B, the resistor 280 is inserted in the end portion 231 of the ground element portion 230. In FIG. 20C, the resistor 281 is inserted in the stub portion 232 of the ground element portion 230 and the stub portion 232 is connected to the ground pattern 210B.

FIG. 21 is a view showing a result of a simulation of VSWR characteristics of the circuit substrate 200A in which the resistor is provided.

Figure 20D:
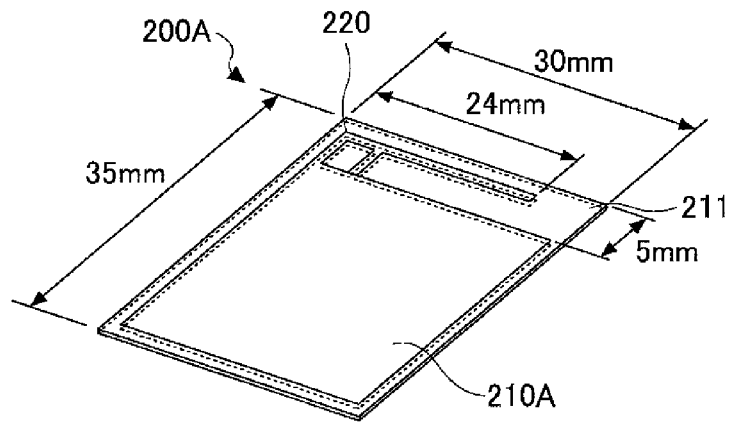

In this simulation, as shown in FIG. 20D, the sizes are as follows. The width of the printed substrate 211 is 30 mm, the length of the printed substrate 211 is 35 mm, and the length of the printed substrate 211 where the ground pattern 210A is not formed is 5 mm. The widths of the antenna element portion 220 and the ground element portion 230 are 1 mm, respectively. The lengths of the linear portion 220a of the antenna element portion 220 and the length of the linear portion 230a of the ground element portion 230 are 24 mm, respectively.

The simulation result of the antenna for comparison, which is the same as that explained with reference to FIG. 19, is shown as "comparison" in FIG. 21.

The simulation result of a case where the circuit substrate 200A includes the combination of the structure shown in FIG. 20A and the structure shown in FIG. 20B with the printed substrate 211 is shown as (A)+(B) in FIG. 21.

The simulation result of a case where the circuit substrate 200A includes the combination of the structure shown in FIG.

20A and the structure shown in FIG. 20C with the printed substrate 211 is shown as (A)+(C) in FIG. 21.

When comparing the case of (A)+(B), and the case of (A)+(C) with the case of (A), as shown in FIG. 21, the VSWR characteristics are improved for the cases of (A)+(B) and (A)+(C). Further, when comparing the case of (A)+(B) with the case of (A)+(C), the minimum value of VSWR characteristics becomes smaller for the case of (A)+(B).

For the case of (A)+(B), the VSWR characteristics are further improved compared with the circuit substrate 200A shown in FIG. 18.

It means that the VSWR characteristics can be improved by inserting the resistor 280 or the resistor 281.

Figure 22A:
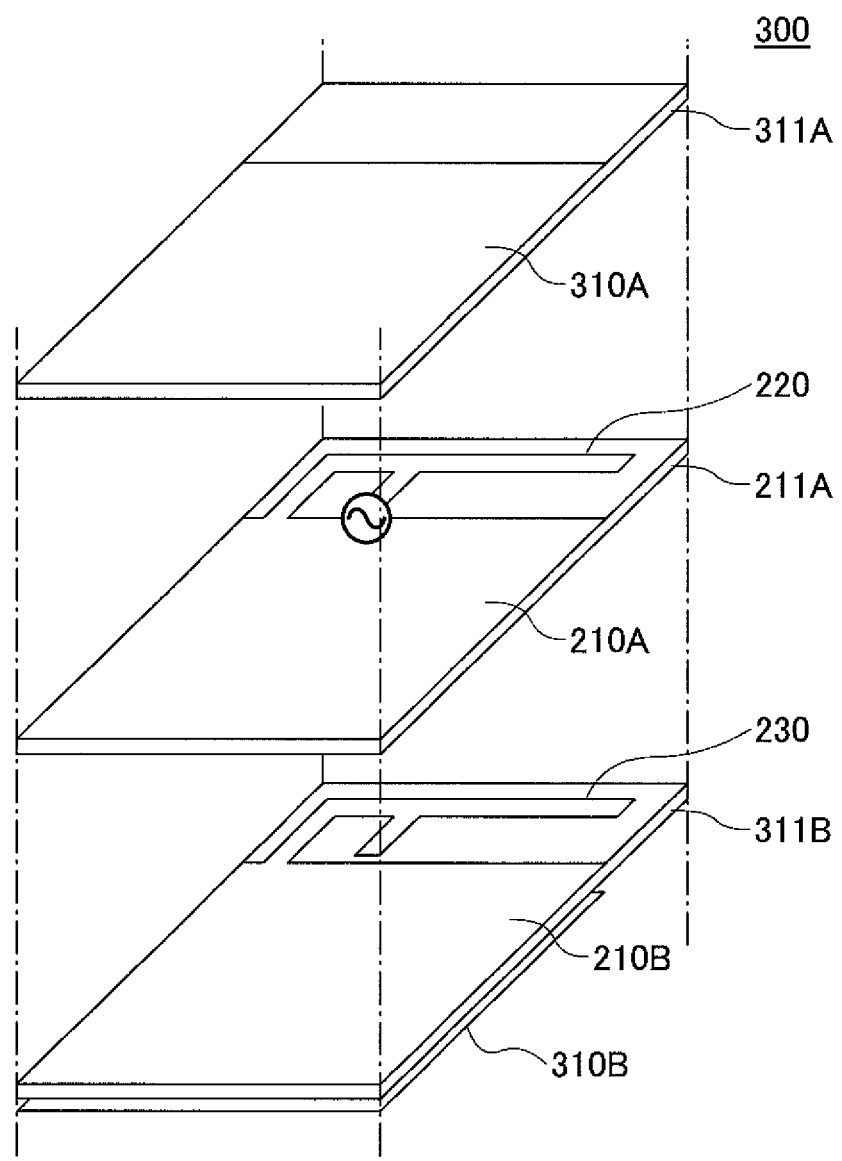
FIG. 22A and FIG. 22B are exploded views showing an antenna device formed as a four-layer board.
Figure 22B:
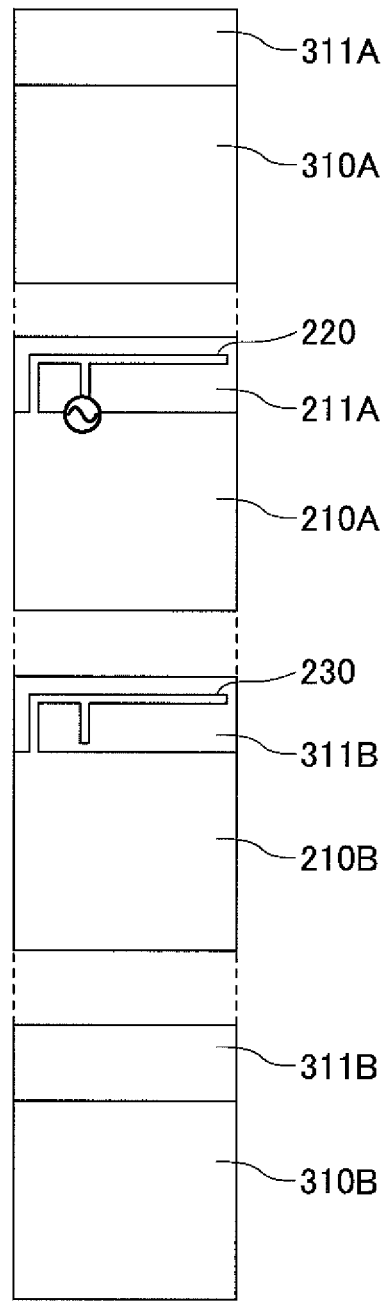
Figure 23:
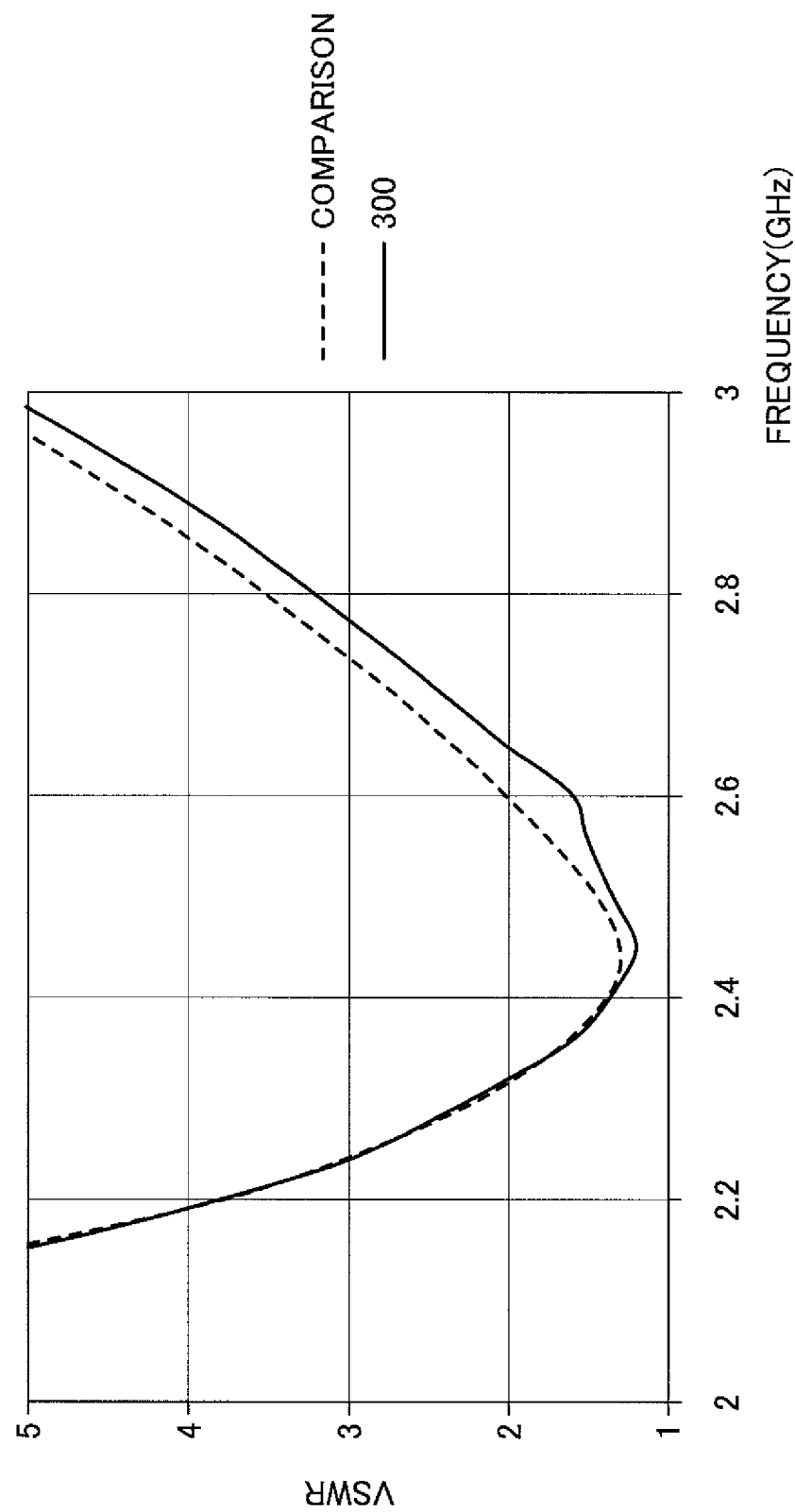
FIG. 23 is a view showing a result of a simulation of VSWR characteristics of the antenna device in the four-layer board.

FIG. 22A and FIG. 22B are exploded views showing a circuit substrate 300 formed as a four-layer board. With reference to FIG. 22A, FIG. 22B and FIG. 23, the result of the simulation of VSWR characteristics of the circuit substrate 300 in a four-layer board is explained.

As shown in FIG. 22A, the circuit substrate 300 includes a printed substrate 311A on a surface of which a ground pattern 310A is formed, a printed substrate 211A on a surface of which the antenna element portion 220 and the ground pattern 210A are formed, and a printed substrate 311B on a surface of which the ground element portion 230 and the ground pattern 210B are formed. The circuit substrate 300 further includes a ground pattern 310B formed at another surface of the printed substrate 311B. The circuit substrate 300 is a four-layer board including four layers of conductive patterns. The printed substrate 311A, the printed substrate 211A, and the printed substrate 311B may be a pre-preg or a core layer. The ground pattern 310A and the ground pattern 210A may be grounded.

FIG. 22B shows plan views of four layers of conductive patterns and three printed substrates showing for explaining a positional relationship. The printed substrate 311A, the printed substrate 211A, and the printed substrate 311B are stacked with each other while aligning the position.

The circuit substrate 300 has a structure in which the printed substrate 311A and the printed substrate 311B are bonded to the upper surface and the lower surface of the circuit substrate 200A shown in FIG. 18, respectively. Further, the ground pattern 310A is formed on a surface of the printed substrate 311A, and the ground pattern 310B is formed on a surface of the printed substrate 311B.

FIG. 23 shows VSWR characteristics of the circuit substrate 300 and the antenna device for comparison. The antenna device for comparison includes the printed substrate 211, the antenna element portion 220, and the ground pattern 210A, which is the same as the antenna device for comparison as explained with reference to FIG. 19.

As shown in FIG. 23, the VSWR characteristics of the circuit substrate 300 are improved compared with the antenna device for comparison.

The maximum values of gain are, +2.3 dBi for the antenna device for comparison, +1.7 dBi for the circuit substrate 300, +0.9 dBi for the structure of (A)+(B) explained with reference to FIG. 21, and −0.5 dBi for the structure of (A)+(C) explained with reference to FIG. 21.

It means that according to the circuit substrate 200A and the circuit substrate 300, which are alternative examples of the first embodiment, the VSWR characteristics can be improved while maintaining the maximum values of gain equal to that of the antenna device for comparison, and the antenna device applicable for broadband can be obtained.

An electronic circuit or the like may be provided in the circuit substrate 200, the circuit substrate 200A or the circuit substrate 300 although not shown in the drawings in the first embodiment. Specifically, the electronic circuit or the like may be provided at an area on the circuit substrate 200, the circuit substrate 200A or the circuit substrate 300 where the ground pattern 210 or the like is not formed or in an inner layer of the circuit substrate 200, the circuit substrate 200A or the circuit substrate 300.

Second Embodiment

The second embodiment is explained. According to the antenna device of the second embodiment, inductance is enlarged by lowering a frequency band to be a predetermined frequency bands without increasing an area at which the antenna element or the like is formed.

Figure 24:
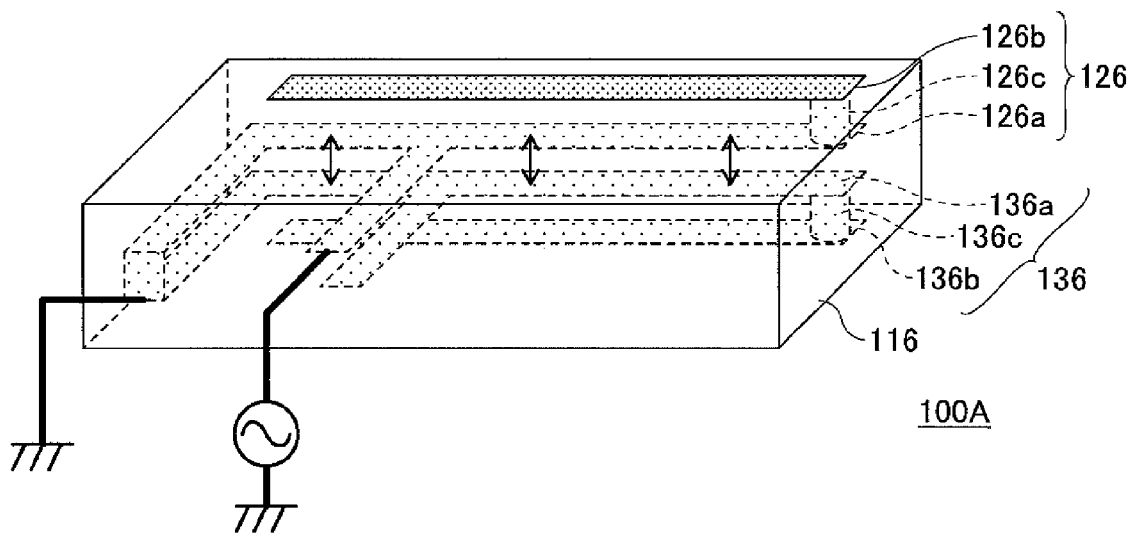
FIG. 24 is a schematic view showing an example of a structure of an antenna device of a second embodiment.

FIG. 24 shows a structure of an antenna structure 100A of the second embodiment. The antenna structure 100A of the embodiment includes a printed substrate 116 of multilayer interconnection, an antenna element 126 which is formed as multilayer, and a ground element 136 which is formed as multilayer.

The antenna element 126 includes a first antenna element 126a formed inside the printed substrate 116, a second antenna element 126b (an example of a third linear portion) formed at a surface of the printed substrate 116, and an antenna element connection portion 126c formed in a through hole provided in the printed substrate 116 for connecting the first antenna element 126a and the second antenna element 126b. The first antenna element 126a may have a shape same as that of the antenna element 120 shown in FIG. 1. Thus, the first antenna element 126a includes a linear portion, a power supply portion, and an end portion.

The ground element 136 includes a first ground element 136a formed inside the printed substrate 116, a second ground element 136b (an example of a fourth linear portion) formed at another surface of the printed substrate 116, and a ground element connection portion 136c formed in a through hole provided in the printed substrate 116 for connecting the first ground element 136a and the second ground element 136b. The first ground element 136a may have a shape same as that of the ground element 130 shown in FIG. 1. Thus, the first ground element 136a includes a linear portion, a stub portion, and an end portion.

In the second embodiment, inductances of the antenna element 126 and the ground element 136 can be increased without enlarging an area for forming the antenna element 126 or the ground element 136 in the printed substrate 116.

Figure 25:
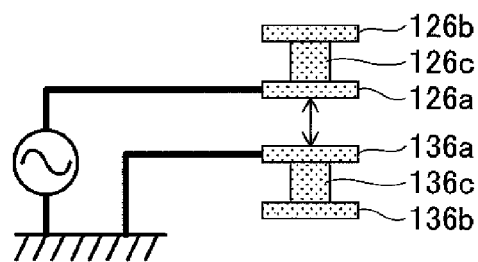
FIG. 25 is a view for explaining the antenna device of the second embodiment.

FIG. 25 is a cross-sectional view schematically showing the antenna element 126 and the ground element 136 shown in FIG. 24. The linear portion of the first antenna element 126a, the second antenna element 126b, the linear portion of the first ground element 136a and the second ground element 136b are formed such that the entirety of these components overlap in a plan view. It means that the first antenna element 126a, the second antenna element 126b, the first ground element 136a and the second ground element 136b are stacked in the thickness direction of the printed substrate 116. With this structure, when a high frequency voltage is applied to the antenna element 126, the antenna element 126 can be driven in the width direction of the printed substrate 116 with a large amount.

Figure 26:
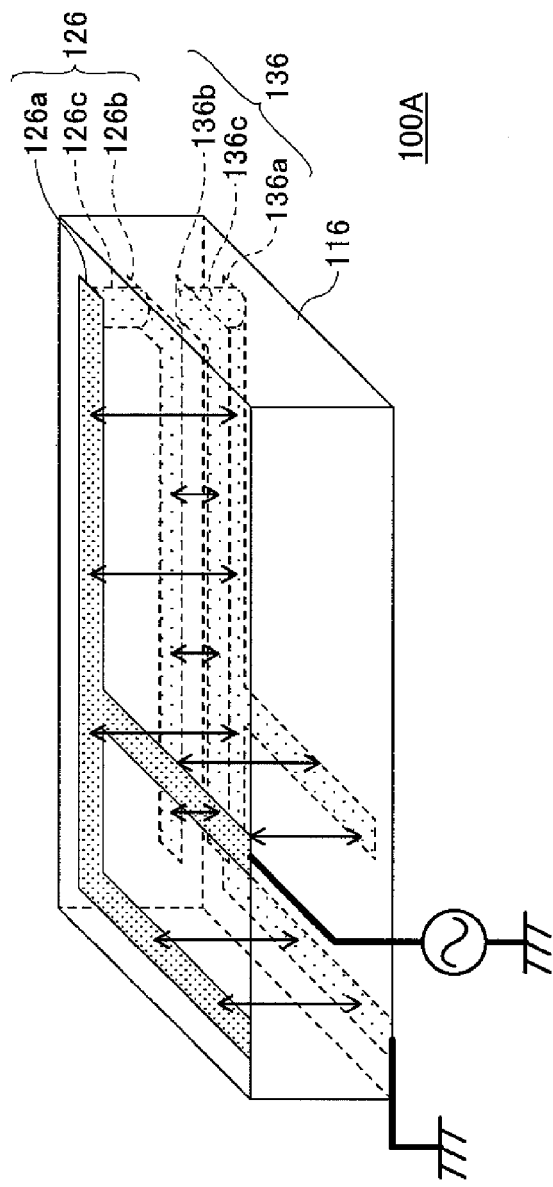
FIG. 26 is a schematic view showing another example of a structure of an antenna device of the second embodiment.
Figure 27:
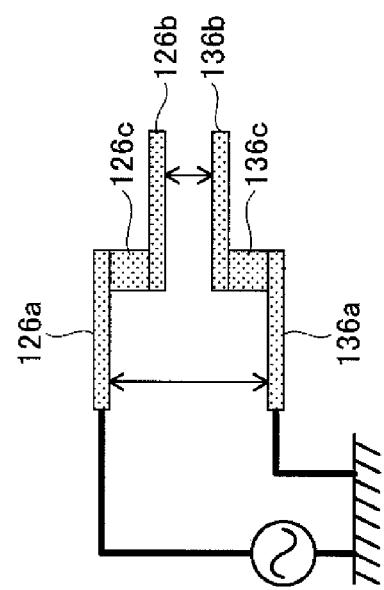
FIG. 27 is a view for explaining the other antenna device of the second embodiment.

Further, alternatively, as shown in FIG. 26, the second antenna element 126b may be formed not to overlap the linear portion of the first antenna element 126a, and the second ground element 136b might not overlap the linear portion of the first ground element 136a. Further, in this example, the first antenna element 126a is formed at one surface of the printed substrate 116 and the first ground element 136a is formed at another surface of the printed substrate 116 and the second antenna element 126b and the second ground element 136b are formed inside the printed substrate 116, respectively. In this case, as the second antenna element 126b and the second ground element 136b are shifted from the first antenna element 126a and the first ground element 136a, respectively, a leakage electric field is generated between the second antenna element 126b and the second ground element 136b to generate an electromagnetic wave. FIG. 27 is a cross-sectional view schematically showing the antenna element 126 and the ground element 136 of the antenna device shown in FIG. 26.

The rest of the parts other than the above are similar to those of the first embodiment. It means that the linear portions of the first antenna element 126a and the first ground element 136a are formed to protrude from the inner housing portion 401 or the battery 420 when the memory card including the antenna structure 100A is inserted in the digital camera 400 as shown in FIG. 5 or FIG. 6.

Third Embodiment

The third embodiment is explained. In this embodiment, a structure for optimizing radiation characteristics of the memory card including the antenna device when a label including a metal layer is attached to the memory card.

Figure 28:
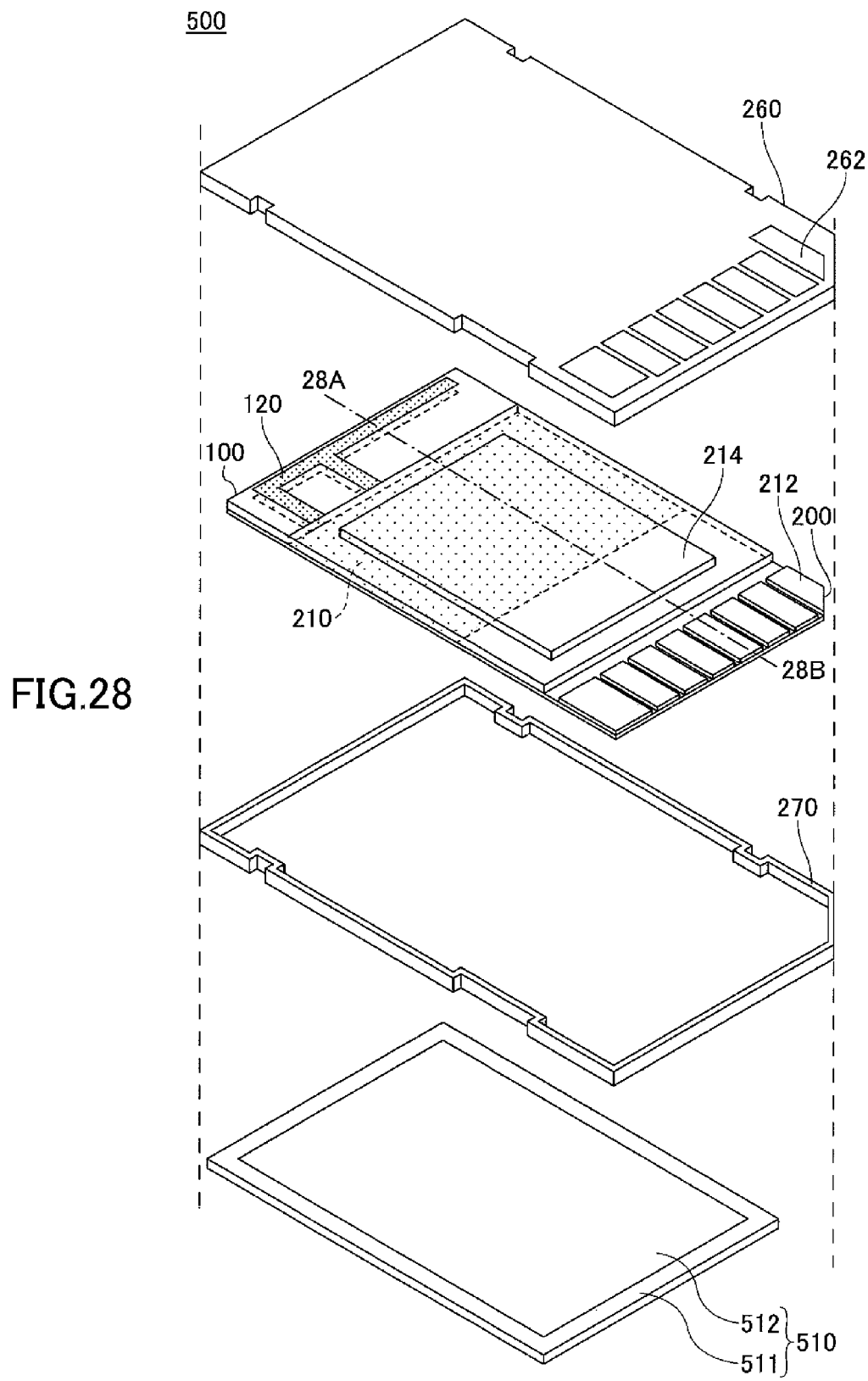
FIG. 28 is an exploded view showing an example of a memory card of a third embodiment.

FIG. 28 is an exploded view of a memory card 500 of the embodiment. The memory card 500 of the embodiment includes a similar structure as the memory card 250 shown in FIG. 4.

Specifically, the memory card 500 shown in FIG. 28 includes a label 510 in addition to the circuit substrate 200 including the antenna structure 100, a first housing 260, and a second housing 270 which are the same as those of the memory card 250 shown in FIG. 4. The label 510 is attached to a surface of the second housing 270 (a lower surface in FIG. 28) of the memory card 500.

In the label 510, a product name, memory capacity or the like of the memory card 500 is written, for example. The label 510 includes a resin film 511 and an aluminum layer 512 (an example of a metal layer) which is formed at a surface (at a side attached to the second housing 270) of the resin film 511.

The resin film is a transparent film, for example. Before forming the aluminum layer 512 on the resin film 511, characters or the like are printed on the resin film 511, and the aluminum layer 512 is formed on the characters or the like. The aluminum layer 512 is formed by a vapor deposition, for example.

When the label 510 is attached to the memory card 500, as the label 510 includes the aluminum layer 512, the radiation characteristics of the antenna structure 100 included in the memory card 500 varies.

FIG. 29A to FIG. 29D are views showing an example of patterns of the aluminum layer 512 to be formed on the label 510.

Figure 29:
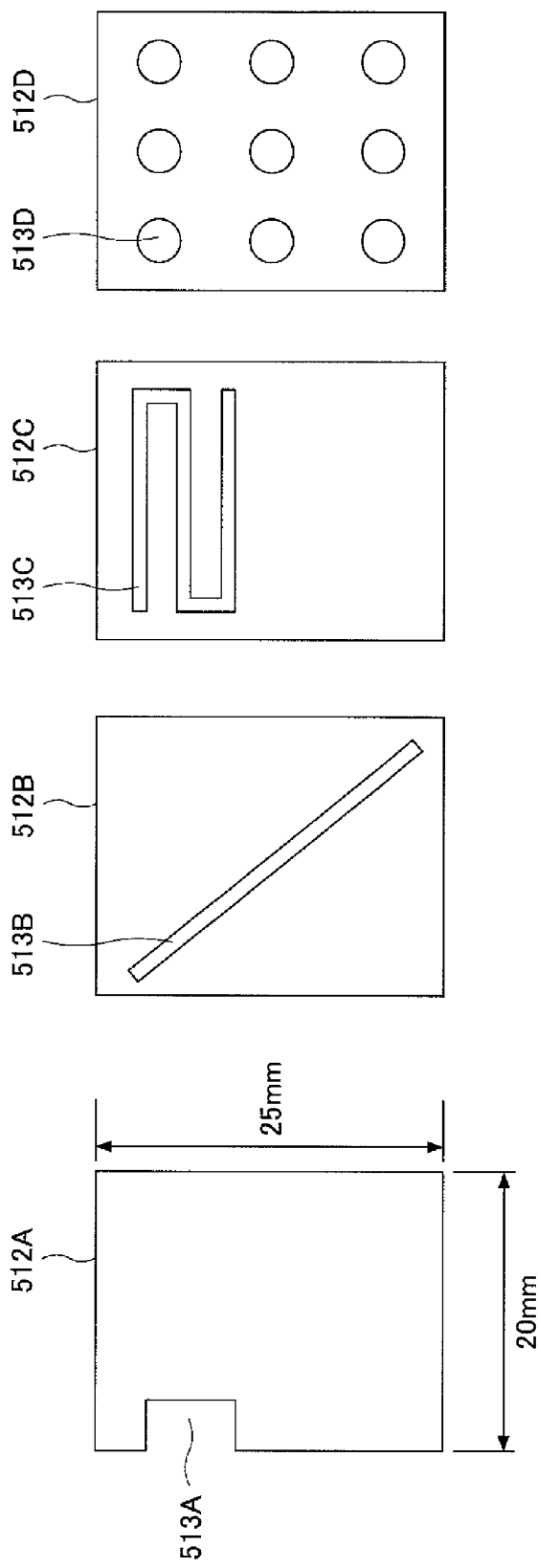
FIG. 29A to FIG. 29D are views showing an example of patterns of aluminum layer to be formed on a label.

An aluminum layer 512A shown in FIG. 29A is provided with a notch 513A. An aluminum layer 512B shown in FIG. 29B is provided with a slot 513B. An aluminum layer 512C shown in FIG. 29C is provided with a slot 513C having a meander shape. An aluminum layer 512D shown in FIG. 29D is provided with plural circular slots 513D which are formed in matrix.

The aluminum layers 512A to 512D are formed to have a length of 25 mm and a width of 20 mm, respectively. The length of the slot 513B is 26 mm, the length of the slot 513C is 60 mm, and the diameter of each of the slots 513D is 1.5 mm. Here, the length of the slot 513C, which is 60 mm, corresponds to a half ($\lambda/2$) of a wavelength $\lambda$ when a frequency is 2.45 GHz.

When the label 510 including the aluminum layer 512B with the slot 513B is attached to the memory card 500, the maximum value of gain is 0.37 dBi. When the label 510 including the aluminum layer 512C with the slot 513C is attached to the memory card 500, the maximum value of gain is 0.38 dBi. When the label 510 including the aluminum layer 512D with the circular slots 513D is attached to the memory card 500, the maximum value of gain is 0.34 dBi. When the label 510 without the notch or the slot is attached to the memory card 500, the maximum value of gain is 0.34 dBi.

With this structure, it is recognized that the maximum value of gain tends to increase by forming the slots 513B to 513D.

Figure 30:
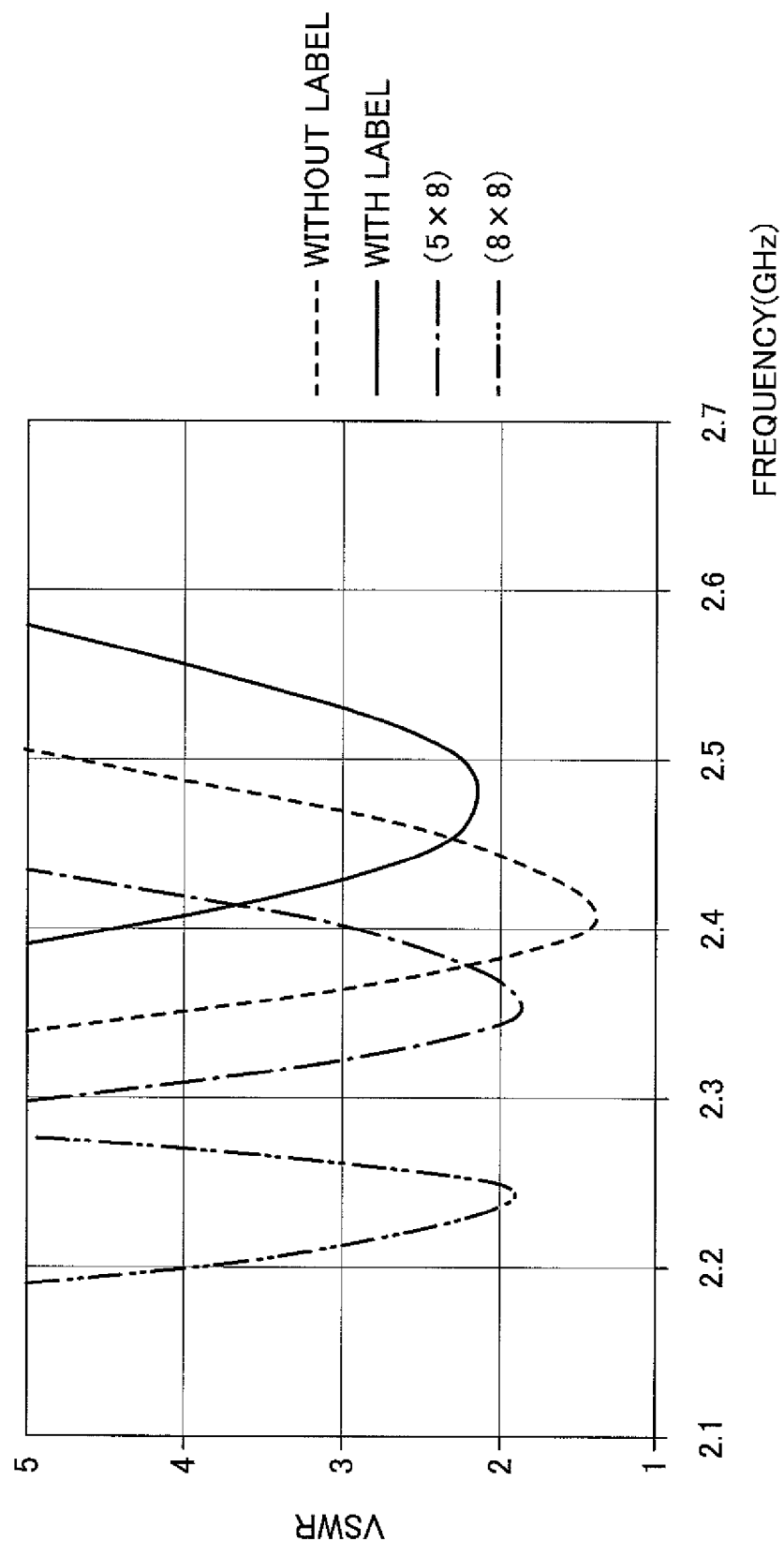
FIG. 30 is a result of a simulation of VSWR characteristics.

FIG. 30 shows a result of a simulation of VSWR characteristics of the memory card 250 (which does not include the label 510), the memory card 500 including the label 510 without the notch or the slot (for comparison), and the memory card 500 including the label 510 with the notch 513A.

The size of the notch 513A is 8 mm×8 mm (vertical× horizontal, 8×8) or 5 mm×8 mm (vertical×horizontal, 5×8).

As shown in FIG. 30, for a case "without label" which is the memory card 250 without the label 510, the minimum value of the VSWR characteristics is about 1.4 at the frequency about 2.42 GHz. For a case "with label" in which the label 510 without the notch or the slot (for comparison) is attached, the minimum value of the VSWR characteristics becomes about 2.2 at the frequency about 2.48 GHz.

For a case "(5×8)" in which the label 510 with the notch 513A of 5 mm×8 mm (length×width), the minimum value of the VSWR characteristics is about 1.7 at the frequency about 2.36 GHz. For a case "(8×8)" in which the label 510 with the notch 513A of 8 mm×8 mm (length×width), the minimum value of the VSWR characteristics is about 1.8 at the frequency about 2.25 GHz.

As described above, by attaching the label 510 including the aluminum layer 512, the VSWR characteristics may be lowered. However, by providing the notch 513A to the aluminum layer 512A, the VSWR characteristics can be improved. Here, the frequency at which the VSWR characteristics becomes the minimum value may be adjusted by inserting a capacitor, an inductor, or resistor to be a desired frequency (for example, 2.45 GHz).

As described above, the aluminum layer 512 (512A, 512B, 512C, and 512D) may be provided with an opening portion such as the notch 513A, the slot 513C, the circular slots 513D or the like. Further, the aluminum layer 512 (512A, 512B, 512C, and 512D) may be provided not to overlap the linear portion 120a and the linear portion 130a.

Further, the VSWR characteristics can be improved when the slot 513B, the slot 513C, or the circular slots 513D (see FIG. 29B to FIG. 29D) are provided instead of the notch 513A.

Although examples where the aluminum layer 512, 512A, 512B, 512C or 512D is formed on the resin film 511 in the label 510 are explained above, a metal layer made of a different material from aluminum may be used instead of the aluminum layer 512, 512A, 512B, 512C or 512D. As the radiation characteristics of the antenna structure 100 vary based on the kinds of materials composing the metal layer, the material may be selected to obtain desired radiation characteristics.

Fourth Embodiment

Figure 31:
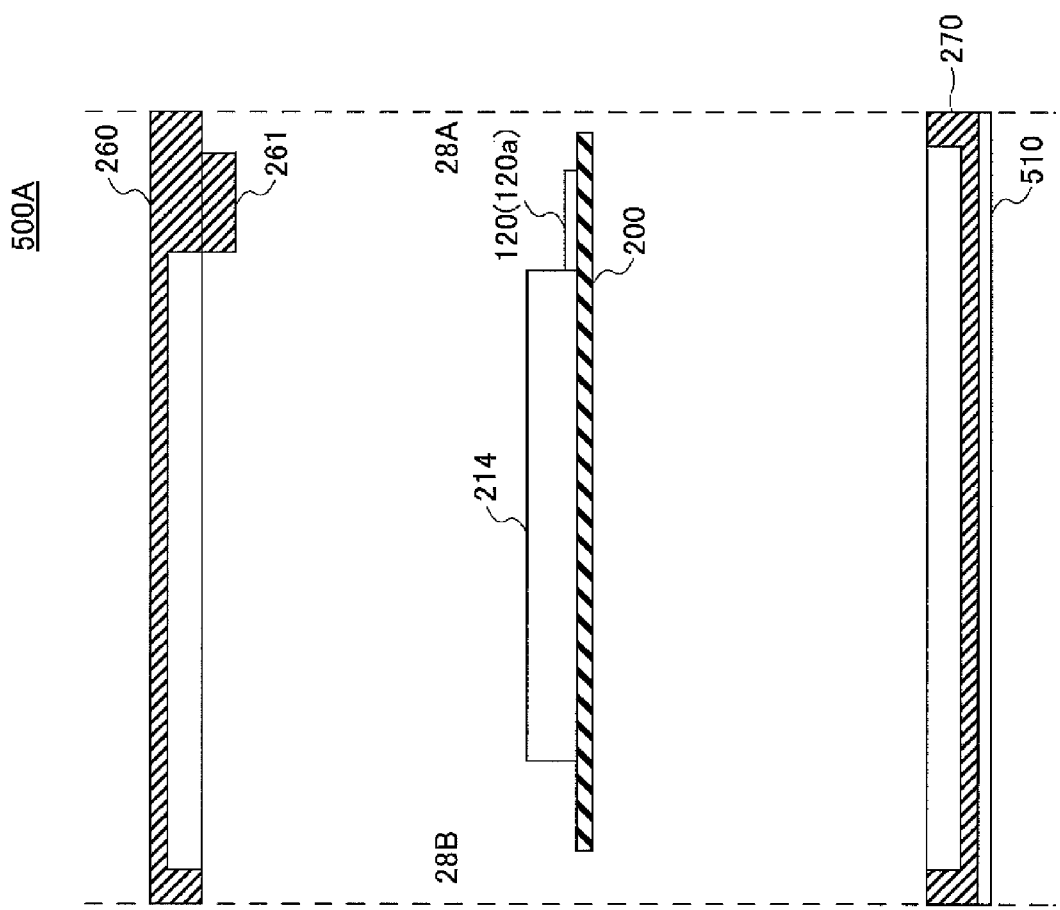
FIG. 31 is an exploded side view of another example of a memory card of the third embodiment.

The fourth embodiment is explained with reference to FIG. 31. FIG. 31 is a side view showing a memory card 500A of the embodiment.

The memory card 500A of the embodiment includes a protruding portion 261 provided at a lower surface of the first housing 260. The protruding portion 261 is provided at a surface (a lower surface in FIG. 31) of the first housing 260 which is to be bonded to the second housing 270 and protrudes to contact the linear portion 120a of the antenna element 120. The protruding portion 261 has a substantially equal length as that of the linear portion 120a of the antenna element 120 to extend above the linear portion 120a. Although not shown in FIG. 31, the antenna structure 100 is mounted in the circuit substrate 200. FIG. 31 corresponds to a dashed 28A-28B line shown in FIG. 28 although the protruding portion 261 is added.

In this embodiment, the protruding portion 261 is integrally formed with the first housing 260. However, alternatively, the protruding portion 261 may be separately formed from the first housing 261 and bonded to the first housing 260.

When the circuit substrate 200 is housed in a space of the second housing 270 and the first housing 260 with the protruding portion 261 is covered on the second housing 270, the protruding portion 261 contacts the antenna element 120.

The protruding portion 261 may be made of a resin material such as a plastic or the like, similar to the first housing 260. Further, a relative dielectric constant of the protruding portion 261 may be larger than that of air, and may be about 3.0.

When the protruding portion 261 is not provided, there is a space above the antenna element 120 between the first housing 260. Thus, when the protruding portion 261 is provided in the first housing 260, compared with a case where the protruding portion 261 is not provided, the relative dielectric constant above the antenna element 120 can be increased. Thus, an effect that a wavelength is shortened above the antenna element 120 can be obtained. As a result, the length of the antenna element 120 can be shortened while maintaining the characteristic.

According to the alternative example of the third embodiment, as it is possible to shorten the length of the linear portion 120a of the antenna element 120, the size of the memory card 500A can be made smaller. Further, although the memory card 500A is shown to include the label 510 in FIG. 31, the memory card 500A may not include the label 510.

According to the embodiments, a memory card including an antenna device having high communication characteristics to be attached inside an electronic device such as a digital camera or the like is provided.

Although a preferred embodiments of the memory card has been specifically illustrated and described, it is to be understood that minor modifications may be made therein without departing from the sprit and scope of the invention as defined by the claims. For example, the antenna device may not include a function of a memory card as long as the antenna device has a structure of a memory card to be inserted in a memory card slot of a targeted electronic device.

The present invention is not limited to the specifically disclosed embodiments, and variations and modifications may be made without departing from the scope of the present invention.

The present application is based on Japanese Priority Application No. 2011-229216 filed on Oct. 18, 2011, the entire contents of which are hereby incorporated by reference.

What is claimed is:

1. An antenna device to be inserted in a memory card slot of an electronic device, comprising:
an insulating layer,
an antenna element formed on one surface of the insulating layer, and
a ground element formed on the other surface of the insulating layer,
the antenna element and the ground element being formed such that at least a part of the antenna element and at least a part of the ground element protrude from the memory card slot of the electronic device when the antenna device is inserted in the memory card slot, respectively; and
a ground pattern formed to be extend in a plane which is parallel to the surfaces of the insulating layer and electrically connected to at least the ground element.

2. The antenna device according to claim 1,
wherein the antenna element includes a first linear portion and the ground element includes a second linear portion provided to overlap the first linear portion of the antenna element in a plan view, and
the antenna element and the ground element are formed such that at least a part of the first linear portion and at least a part of the second linear portion protrude from the memory card slot of the electronic device when the antenna device is inserted in the memory card slot, respectively.

3. The antenna device according to claim 2,
wherein the first linear portion and the second linear portion extend in a first direction, respectively,
the antenna element further includes
a power supply portion for being applied with a voltage connected to the first linear portion and extending in a second direction substantially perpendicular to the first direction, and
a first ground portion for being grounded connected to an end of the first linear portion to be extended in the second direction, and
the ground element further includes
a stub portion connected to the second linear portion and extending in the second direction to overlap the power supply portion of the antenna element in a plan view
a second ground portion for being grounded connected to an end of the second linear portion and extending in the second direction to overlap the first ground portion of the antenna element.

4. The antenna device according to claim 2,
wherein the first linear portion and the second linear portion extend in a first direction, respectively,
the antenna element further includes a power supply portion for being applied with a voltage connected to the first linear portion and extending in a second direction substantially perpendicular to the first direction, and
the ground element further includes a ground portion for being grounded connected to the second linear portion and extending in the second direction to overlap the power supply portion of the antenna element in a plan view.

5. The antenna device according to claim 2,
wherein the ground pattern is formed not to overlap the first linear portion of the antenna element and a distance between the first linear portion and the ground pattern is less than or equal to $0.05\lambda$ (where "$\lambda$" is a wavelength of a voltage), in a plan view.

6. The antenna device according to claim 1,
wherein the antenna element and the ground element are substantially symmetrically formed from each other while interposing the insulating layer therebetween at substantially the same position in a plane view.

7. The antenna device according to claim 2,
wherein the insulating layer includes plural layers,
the antenna element further includes a third linear portion electrically connected to the first linear portion and formed in a different layer from the first linear portion, and
the ground element further includes a fourth linear portion electrically connected to the second linear portion and formed in a different layer from the first linear portion, the second linear portion, and the third linear portion to overlap the third linear portion of the antenna element in a plan view.

8. The antenna device according to claim 1,
wherein the antenna device is used for a frequency band between 2.4 GHz to 2.5 GHz.

9. The antenna device according to claim 1,
wherein the antenna device is used for Wireless Local Area Networks or Bluetooth.

10. The antenna device according to claim 1, further comprising:
a housing that covers the insulating layer, the antenna element, and the ground element; and
a metal layer provided at a surface of the housing.

11. The antenna device according to claim 3,
wherein the first ground portion of the antenna element and the second ground portion of the ground element are electrically connected to the ground pattern.

* * * * *